(12) United States Patent
Marsh et al.

(10) Patent No.: US 8,172,912 B2
(45) Date of Patent: May 8, 2012

(54) SELF-REGULATING GAS GENERATOR AND METHOD

(75) Inventors: Stephen A. Marsh, Carlisle, MA (US); Donald M. Parker, Marblehead, MA (US); Peter N. Pintauro, Shaker Heights, OH (US)

(73) Assignee: Encite, LLC, Burlington, MA (US)

( * ) Notice: Subject to any disclaimer, the term of this patent is extended or adjusted under 35 U.S.C. 154(b) by 1446 days.

(21) Appl. No.: 10/989,116

(22) Filed: Nov. 15, 2004

(65) Prior Publication Data
US 2005/0158595 A1 Jul. 21, 2005

Related U.S. Application Data

(60) Provisional application No. 60/520,149, filed on Nov. 14, 2003.

(51) Int. Cl.
*B01J 7/00* (2006.01)
*H01M 8/06* (2006.01)
*C01B 3/36* (2006.01)
*C01B 6/24* (2006.01)
*C01B 3/00* (2006.01)

(52) U.S. Cl. ......... 48/61; 48/197 R; 423/644; 423/658.2

(58) Field of Classification Search .................. 48/61
See application file for complete search history.

(56) References Cited

U.S. PATENT DOCUMENTS

| | | | |
|---|---|---|---|
| 3,554,707 A | 4/1968 | Holmes et al. | |
| 4,404,170 A | 9/1983 | Caudy et al. | |
| 6,544,400 B2 | 4/2003 | Hockaday et al. | |
| 6,683,025 B2 | 1/2004 | Amendola et al. | |
| 6,939,529 B2 * | 9/2005 | Strizki et al. | 423/658.2 |
| 7,316,719 B2 | 1/2008 | Devos | |
| 7,655,056 B2 | 2/2010 | Devos | |
| 2001/0014477 A1 * | 8/2001 | Pelc et al. | 436/49 |
| 2001/0045364 A1 * | 11/2001 | Hockaday et al. | 205/338 |
| 2002/0083643 A1 | 7/2002 | Amendola et al. | |
| 2002/0100518 A1 * | 8/2002 | Kuriiwa et al. | 141/4 |
| 2004/0120889 A1 * | 6/2004 | Shah et al. | 423/657 |

FOREIGN PATENT DOCUMENTS

| | | |
|---|---|---|
| DE | 100 50 554 A1 | 4/2002 |
| WO | WO 01/74710 A1 | 10/2001 |
| WO | WO 02/08118 A1 | 1/2002 |
| WO | WO02/30810 A1 | 4/2002 |
| WO | WO2004/085307 A1 | 10/2004 |

OTHER PUBLICATIONS

Database WPI, Derwent Publications Ltd., London, GB; WPI Account No. 2002-463254/200249 (Manhattan Scientifics Inc.), Oct. 12, 2000.
Notification of Transmittal of the International Search Report (ISR) and the Written Opinion (WO) of the International Searching Authority, or the Declaration, with ISR and WO, PCT/US2004/038565, mailed Apr. 12, 2005.
Notification Concerning Transmittal of International Preliminary Report on Patentability, PCT/US2004/038565, mailed May 26, 2006.

* cited by examiner

*Primary Examiner* — Matthew Merkling
(74) *Attorney, Agent, or Firm* — Hamilton, Brook, Smith & Reynolds, P.C.

(57) ABSTRACT

A self-regulating gas generator that, in response to gas demand, supplies and automatically adjusts the amount of gas (e.g., hydrogen or oxygen) catalytically generated in a chemical supply chamber from an appropriate chemical supply, such as a chemical solution, gas dissolved in liquid, or mixture. The gas generator may employ a piston, rotating rod, or other element(s) to expose the chemical supply to the catalyst in controlled amounts. The gas generator may be used to provide gas for various gas consuming devices, such as a fuel cell, torch, or oxygen respiratory devices.

141 Claims, 13 Drawing Sheets

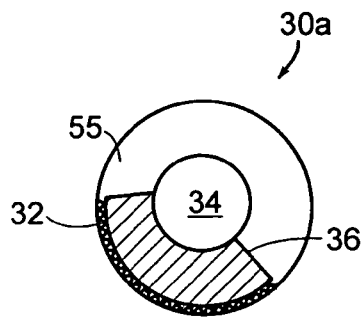
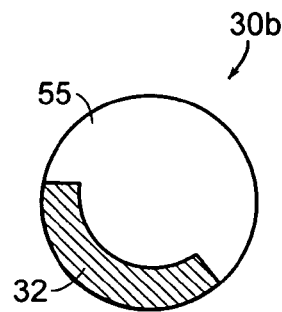
FIG. 6B  FIG. 6C
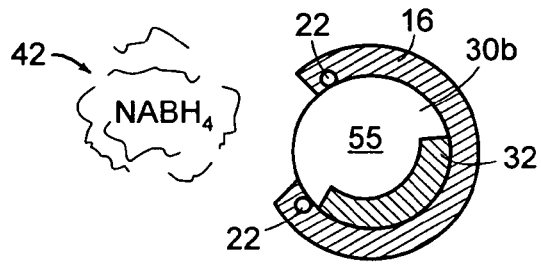
FIG. 6D
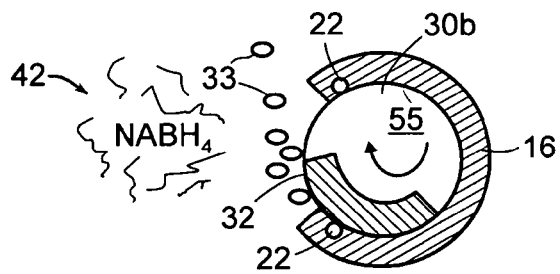
FIG. 6E
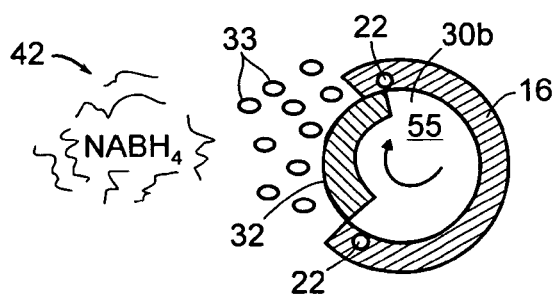
FIG. 6F

SELF-REGULATING GAS GENERATOR AND METHOD

RELATED APPLICATION

This application claims the benefit of U.S. Provisional Application No. 60/520,149, filed on Nov. 14, 2003. The entire teachings of the above application are incorporated herein by reference.

BACKGROUND OF THE INVENTION

Presently, nearly all military, industrial, and consumer electronics are powered by conventional sources—AC wall outlets, gas generators, or disposable or rechargeable batteries. Each of these power sources has its own drawbacks. One such drawback is in the form of pollution, where AC power generation plants, gas generators, and batteries produce respective environmentally unfriendly by-products (e.g., ozone destroying gases and battery acid waste).

Fuel cells have been proposed as an environmentally friendly solution to this problem. To be adopted as a solution, however, fuel (e.g., hydrogen gas) must be easily and safely accessible at a price competitive with its conventional counterparts.

Portable gas generators can safely produce high purity gas on demand. Such generators are useful in providing hydrogen gas as a fuel for fuel cells or other types of gases for other gas utilizing devices. In the case of generating hydrogen gas for fuel cells, which are expected to be used for many different military, industrial, and consumer applications, portable gas generators that are accepted in these markets will likely be lightweight, mechanically simple, demand responsive (i.e., produce gas only when the device using the fuel requires power), capable of operating in any orientation, and designed to store only small amounts of gas from the time the gas is generated until the time it is supplied to the device, thereby minimizing safety concerns of storing gases that are flammable or otherwise potentially dangerous.

SUMMARY OF THE INVENTION

A self-regulating, portable, gas generator, or method of gas generation corresponding thereto, according to the principles of the present invention generates gas for diverse portable power generation applications in a manner that automatically increases or decreases gas production rates in response to usage requirements. The self-regulating gas generator provides portability and has safety characteristics suitable for military, industrial, and consumer applications. Some embodiments of the self-regulating gas generator exhibit long lifespan of catalyst used to generate gas from a chemical supply based on the self-regulating features.

In one embodiment according to the principles of the present invention, a gas generator comprises a chamber for a chemical supply, such as a $NaBH_4$ solution. At least one element, closed to passage of the chemical supply, contains or is coated with a catalyst, such as platinum. In one embodiment, the element(s) move relative to the chemical supply chamber to position the catalyst relative to the chemical supply. In the presence of the catalyst, the chemical supply decomposes into products, including a generated gas, such as hydrogen gas, in the chemical supply chamber. The gas generator also includes a gas storage chamber, which stores the generated gas until use by a fuel cell to convert into electrical energy or by another gas consuming device to use for its intended purpose. The generated gas travels through a gas permeable structure (e.g., membrane) on a path from the chemical supply chamber to the gas storage chamber. The gas permeable structure may be located on, in, or apart from the element(s) where the catalyst is located. The position of the element(s) and, hence, the catalyst relative to the chemical supply, may be regulated by a feedback system utilizing a force generated in part by pressure in at least one of the chambers to position the catalyst in the presence of the chemical supply to regulate rate of generation of the generated gas.

The element(s) may take many forms and position the catalyst relative to the chemical supply in various ways. For example, the element(s) may translate relative to the chemical supply chamber, rotate relative to the chemical supply chamber, or remain in a fixed position relative to a body that includes the chemical supply chamber. Motion of the element(s) may alter the amount of catalyst exposed to the chemical supply. The element(s) may be ceramic or optionally made of thermally-conductive material(s). In some embodiments, the element(s) may be pistons, in which case they may be a hollow piston or a solid piston. In the case of a hollow piston, the element(s) may have one internal channel or may have internal structure that defines multiple channels adapted to allow the generated gas to flow through the piston on a path from the chemical supply chamber to the gas storage chamber.

In some embodiments, the element(s) are solid pistons that move relative to the chemical supply to a position that creates an equilibrium of forces acting upon the element(s), where the forces include forces due to a spring operatively connected to the element(s). In the solid piston embodiment, the chemical supply chamber may have a boundary or portion thereof that is a gas permeable structure. In some cases, the gas permeable structure may be a gas permeable membrane through which the generated gas passes across substantially the entire gas permeable membrane; and, in other embodiments, the gas permeable structure includes portions of gas permeable membrane and portions of non-gas permeable membrane. In some hollow piston embodiments, the element(s) may be coated with a gas permeable catalyst layer and the gas permeable structure.

The gas generator may include at least one adjustable spring connected to the elements. The spring(s) allow the relationship between pressure in the gas storage chamber and the position of the element(s) to be adjusted.

The element(s) may be coated with the gas permeable structure, covered with the gas permeable structure, or integrated into the gas permeable structure. The element(s) may also include a non-catalytic portion, which may be located along the length of the element(s). In the case of the element(s) being operated as a piston, the non-catalytic portion may be located at an end of the piston. The element(s) may be adapted to position the catalytic and non-catalytic portions with respect to the chemical supply so no catalyst is exposed to the chemical supply. Such a position discontinues decomposition of the chemical supply. The gas generator may also include a "wipe" that is adapted to dislodge products from the element(s) so as not to accumulate the products or other materials on the element(s), thereby increasing the lifespan of the catalyst or the element(s) themselves.

The gas permeable structure may include various aspects or perform various functions. For example, the gas permeable structure may separate a gas, such as hydrogen gas ($H_2$) from the chemical supply. The gas permeable structure may include palladium (Pd) or polymer structure. The gas permeable structure may be mechanically connected to the element(s).

The catalyst may be implemented in various forms. For example, the catalyst may include at least one of the following catalysts: a metal, metal boride, or polymer. The catalyst may be attached to the gas permeable structure, coated upon the gas permeable structure, attached to a non-permeable portion of the element(s), or coated on a non-permeable portion of the element(s).

The gas generator may also include other features. For example, the gas generator may include a capacity indicator that activates if the gas storage chamber reaches a predetermined pressure, such as substantially maximum gas capacity or it may provide an indication that the chemical supply is substantially exhausted. The gas generator may also include at least one pressure relief valve that reduces pressure of the gas storage chamber or chemical storage chamber if pressure in the respective chamber exceeds a predetermined threshold. The gas generator may also include a filter through which the generated gas passes before output for use by an external device. In another embodiment, the gas generator may include a humidifier through which the generated gas passes before output for use by an external device. The gas generator may also include a transducer for detecting a position of the element(s) relative to a known position of the chemical supply chamber.

The feedback system may regulate a rate at which the generated gas is generated. The feedback system may utilize a force generated by a pressure differential (i) between the gas storage chamber and the chemical supply chamber, (ii) between the gas storage chamber and the reference pressure chamber, or (iii) between the chemical supply chamber and the reference pressure chamber. In another embodiment, the gas generator may include a spring connected to at least one element, and the feedback system may utilize the differential between a pressure in at least one of the chambers acting upon the element and the force of the spring acting upon that same element.

The chemical supply may be provided in various forms. For example, the chemical supply may be a solid, liquid, gas dissolved in a liquid, or combination of a liquid and a gas dissolved in a liquid. The chemical supply may include any chemical hydride, aqueous $NaBH_4$, or solution of $NaBH_4$ and at least one alkali metal salt, in which case the aqueous $NaBH_4$ solution may include an effective amount of co-solvent or other additive. In another embodiment, the chemical supply is an aqueous $NaBH_4$ solution that decomposes in the presence of the catalyst to produce hydrogen gas, where the catalyst may be selected from at least one of the following catalysts: Ruthenium (Ru), Rhodium (Rh), Palladium (Pd), Iridium (Ir), Platinum (Pt), Rhenium (Re), and Nickel (Ni). In yet another embodiment, the chemical supply may include $NaBH_4$ stored as a dry powder. The dry powder may be caused to mix with a predetermined liquid either (i) by breaking a membrane containing the dry $NaBH_4$ powder, (ii) by shaking or squeezing the gas generator, or (iii) by puncturing the membrane.

The generated gas may be many types of different gases. Two cases include hydrogen gas and oxygen ($O_2$) gas. These gases can be used in various applications, including, for example: (i) fuel cell applications that react hydrogen gas and oxygen to generate electricity, (ii) torches that burn hydrogen gas, or (iii) oxygen respiratory devices that provide substantially pure oxygen to medical patients. It should be understood that there are many other applications that use either of these two gases, and still further applications that use other gases. It should be understood that the principles of the present invention are not limited to or by the type of gas generated by the example embodiments described herein.

Some of the gas generator embodiments described herein include some or all of the following safety and operational features that make it useful for many applications. These features in no particular order may include: automatic gas production sufficient to match consumption rates, compact or large design, orientation insensitivity, high level of system safety, and automatic limiting of hydrogen gas or other gas production so that the gas generator cannot have a runaway reaction. For example, if hydrogen gas pressures become too large (i.e., too much hydrogen gas is being produced), the system may automatically shut itself down.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 6B-6C are mechanical diagrams of an element (e.g., rotating rod) used in the gas generator of FIG. 6A;

FIGS. 6D-6F are mechanical diagrams of the element of FIG. 6C in operation;

DETAILED DESCRIPTION OF THE INVENTION

A description of preferred embodiments of the invention follows.

Figure 1:
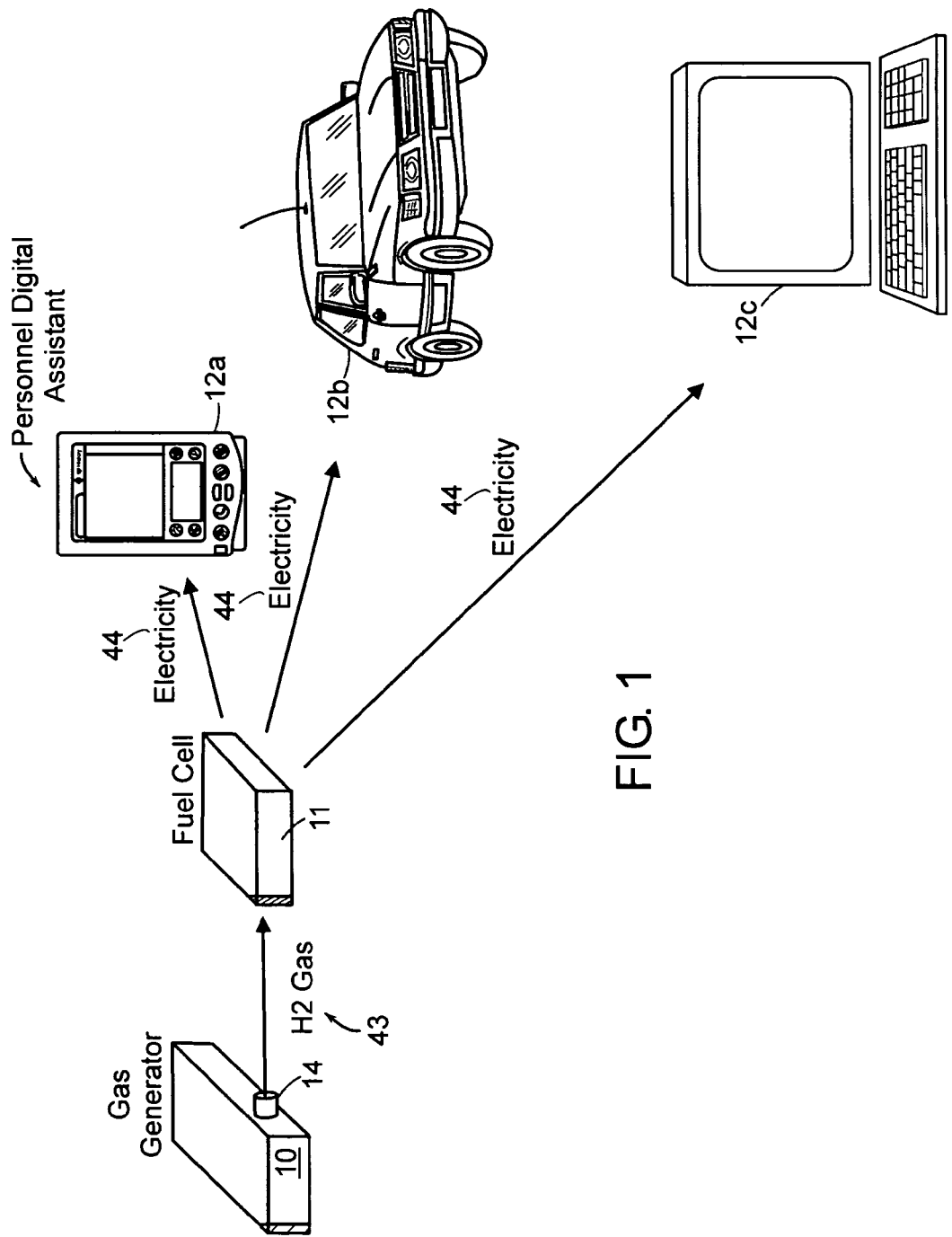
FIG. 1 is a graphical diagram of a fuel cell application in which a gas generator according to the principles of the present invention may be employed.

FIG. 1 is a graphical diagram of a fuel cell application in which a gas generator 10 according to the principles of the present invention may be employed. In the fuel cell application, the gas generator 10 generates and delivers hydrogen gas gas to a fuel cell 11. The fuel cell 11 reacts the hydrogen gas and oxygen to produce electricity 44, as well known in the art. The fuel cell 11 provides the electricity 44 to an electricity-consuming device, such as a personal entertainment device 12a (e.g., MP3 player), remote controlled car 12b, or portable computer 12c. Other fuel cell applications include military electronics, industrial electronics (e.g., printing presses), or consumer electronics (e.g., cellular telephones, Personal Digital Assistants (PDA's), and so forth).

Generally, a fuel cell consumes hydrogen gas at a rate depending on the power its generating. An example fuel cell is described in U.S. Pat. No. 6,312,846, issued Nov. 6, 2001; the entire teachings of which are incorporated herein by reference. In that patent, a fuel cell is described that, in some embodiments, can change its configuration in a dynamic manner, responsive to its load. For example, at times there is more load, the fuel cell can dynamically configure itself to consume more fuel to meet power demand, and at times there is less load, the fuel cell can dynamically configure itself to conserve fuel.

There are many different sizes and configurations that the gas generator 10, fuel cell 11, or integrated combination(s) can take. For purposes of describing the principles of the present invention, however, the sizes, both absolute and relative, and interfacing of these devices are unimportant. What is important is (i) the process and example gas generator embodiments for generating gas and (ii) the relationship between the rate of gas usage by the fuel cell 11 and rate of gas generation by the gas generator 10. In the case of generating gas for the fuel cell 11, the gas generator 10 generates hydrogen gas.

The ability to generate relatively pure hydrogen gas, hydrogen gas, by reaction of metal hydrides or other appropriate solid reactants dissolved in water is well known. One particular hydride, sodium borohydride, $NaBH_4$, has been used for over 50 years as a convenient, safe source of hydrogen gas. When $NaBH_4$ powder is dissolved in water, it forms a slightly alkaline, low pressure, non-flammable solution. When this aqueous solution is exposed to selected metals, combination of metals, metal boride catalysts, or even heat, hydrogen gas is rapidly evolved together with water-soluble sodium borate. This catalytically driven, decomposition (hydrolysis) reaction may be written as:

$$NaBH_4(aq)+2H_2O(l) \rightarrow 4H_2(g)+NaBO_2(aq) \quad \text{(Equation 1)}$$

In Equation 1, which describes a hydrolysis reaction, water ($H_2O$) is a reactant—two water molecules are consumed for every four molecules of hydrogen gas generated. As this reaction continues to generate hydrogen gas, the remaining $NaBH_4$ solution near the catalyst becomes more concentrated in $NaBH_4$ since there is less free water available. While decreased water supply in the bulk $NaBH_4$ solution is not a direct problem, the other reaction product of Equation 1, sodium borate, $NaBO_2$, is formed in the presence of less water. This results in a more concentrated solution in the vicinity of the catalyst. Sodium borate is water soluble, but not very water soluble. This means that when hydrogen gas is generated and, simultaneously, $NaBO_2$ product is formed, some $NaBO_2$ may begin to precipitate and deposit on or near the catalyst. Build-up of $NaBO_2$ on the catalyst can eventually reduce the subsequent activity of the catalyst or other gas generating device. This can be a serious problem anytime $NaBH_4$ solution contacts a catalyst.

To overcome this problem, as will be shown in accordance with some embodiments of the gas generator 10 according to the principles of the present invention, the gas generator 10 exposes the catalyst (e.g., moves the catalyst into or out of the $NaBH_4$ solution) in a self-regulating manner. In a piston-type embodiment, catalyst position (i.e., the depth to which the selected catalyst is immersed in $NaBH_4$ solution) controls hydrogen gas generation rates. Because the reservoir of $NaBH_4$ solution in the device is relatively large compared to the surface area of the catalyst, any $NaBO_2$ formed during hydrogen gas generation tends to remain soluble and in solution. Even if the solubility limit of $NaBO_2$ is eventually exceeded, $NaBO_2$ precipitates and deposits elsewhere in the $NaBH_4$ solution, and not necessarily on the catalyst surface. Thus, catalyst lifespan is extended.

Furthermore, in the piston-type embodiment, the depth the supported catalyst on the piston is immersed in $NaBH_4$ solution is controlled by a mechanically simple, pressure related, feedback system. This feedback system automatically senses a build-up or decrease in hydrogen gas pressure based on hydrogen gas consumption by a fuel cell or other hydrogen gas utilizing device. In other words, when the hydrogen gas consuming device requires less hydrogen gas, such as when the electrical load on the fuel cell 11 is small or zero, the hydrogen gas generator 10 senses this decreased demand and ceases producing hydrogen gas. In addition, the feedback control system for regulating hydrogen gas generation rates is mechanically simple in some embodiments, i.e., does not involve bulky or expensive pressure sensing feedback controllers and/or mechanical pumps. The principles of the present invention allows the gas generator 10 to operate free of electrically driven mechanical pumps or wicking agents to move the chemical supply (e.g., $NaBH_4$ solutions) since the mechanical solution is exposed to the catalyst in a chemical supply chamber. This design is therefore suitable for potentially low cost, portable applications and is orientation insensitive.

Other embodiments that use elements besides pistons, hollow or solid, that put catalysts in the presence of a chemical supply are also within the scope of the principles of the present invention. For example, the catalyst may be associated with a disk, rod, sphere, or combination thereof that rotate(s) to expose the chemical supply to the catalyst by increasing or decreasing an amount of catalyst to which the chemical supply is exposed. The feedback system in rotating catalyst embodiments may be similar to or different from translating (e.g., piston-type) embodiments. Example feedback systems that support the translating or rotating embodiments are described hereinbelow. The pistons, disks, spheres, and so forth may be generally referred to herein as an "element." The elements are closed to passage of the chemical supply and interact with the chemical supply. "Closed to passage" of the chemical supply means that substantially no chemical supply enters the element(s) or, in some other embodiments, allows some chemical supply to enter but includes structure that prevents the chemical supply from flowing through to the gas storage chamber.

In some embodiments, the generated gas produced by the catalyst and chemical supply may pass through the element(s). In other embodiments, the element(s) are solid, and the gas passes from the chemical supply chamber to the gas storage chamber without passing through the element(s).

The illustrative examples described herein primarily describe hydrogen gas generation for use in a fuel cell application. In the fuel cell application, the hydrogen gas is generated from a particular aqueous chemical hydride solution, but the gas generator 10 is not limited to generating hydrogen gas from particular chemical hydride or particular aqueous solutions. In a broader, general sense, the concepts and mechanical designs described herein may be generally applied to any gas generation system where a particular gas is generated in a self-regulated manner from any gas, liquid, mixture, or even solid chemical by means of a selected catalyst, device, or element.

In some embodiments, a catalyst is associated with a small element (e.g., piston or disk) that moves the catalyst into or out of a larger volume of $NaBH_4$ chemical supply. This has advantages over moving the chemical supply to the catalyst in that it is easier, safer, and less energy intensive to move a small piston or disk than it is to move a relatively large amount of liquid chemical.

Figure 2A:
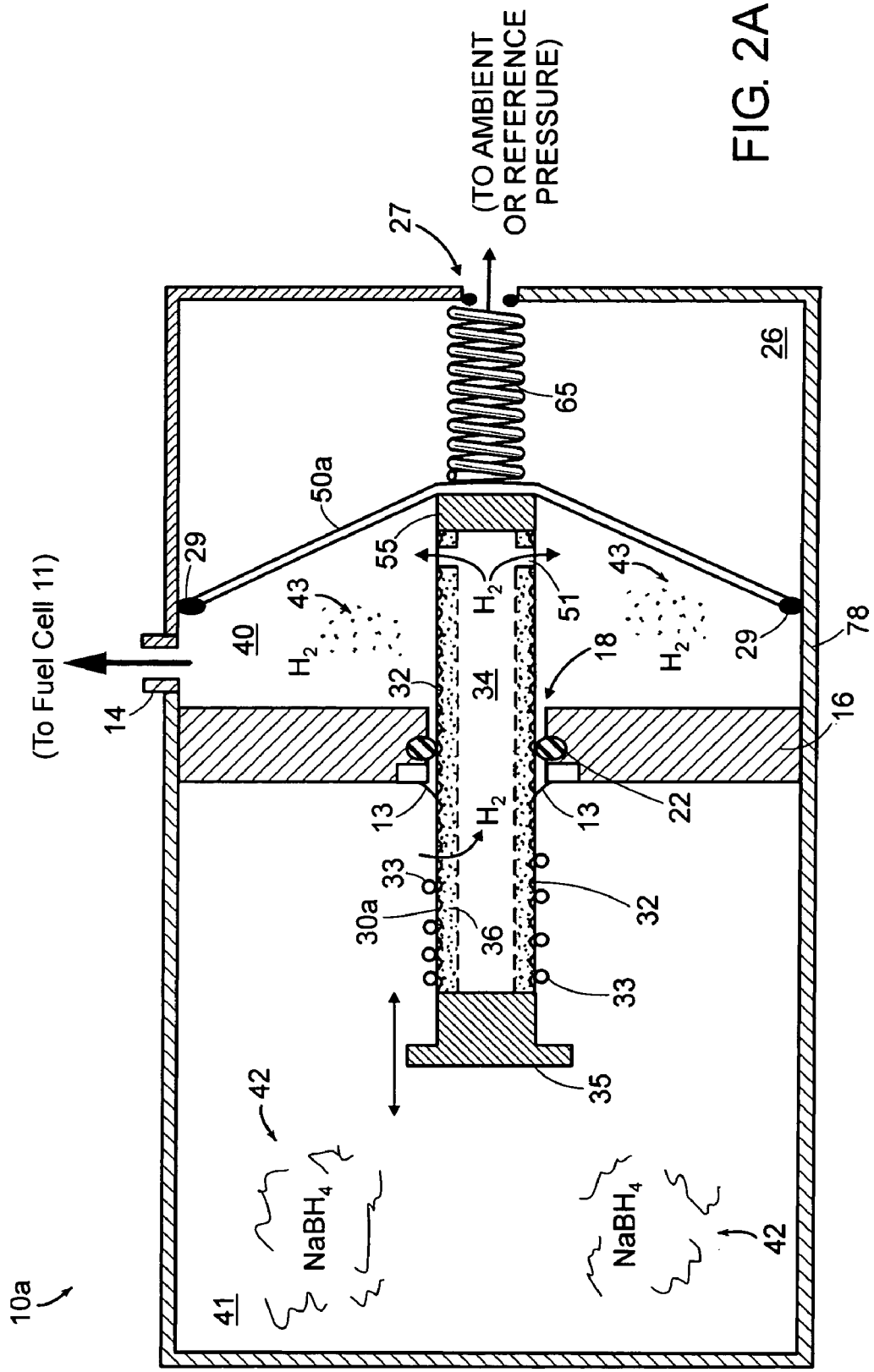
FIG. 2A is a schematic diagram of the gas generator of FIG. 1.

FIG. 2A shows a first embodiment of the self-regulating gas generator 10a of FIG. 1. The gas generator 10a has three chambers: a chemical supply chamber 41 (left), a generated gas storage chamber 40 (middle), and a reference pressure chamber 26 (right).

In the case of generating hydrogen gas for a fuel cell 11, for example, the chemical supply chamber 41 stores an aqueous $NaBH_4$ solution 42. It should be understood the general design concept described herein is not limited to sodium borohydride ($NaBH_4$) or indeed even a chemical hydride. Any solid, liquid, or gas that, under suitable conditions, can generate a desired specific gas (e.g., hydrogen gas) when exposed to a selected catalyst may be substituted for the aqueous $NaBH_4$ solution 42.

In the embodiment of FIG. 2A, the chemical supply chamber 41 and gas storage chamber 40 are separated by a solid wall or partition 16 having a hole 18 cut or formed through it. Into this hole 18, an element 30a, such as a hollow piston 30a, is fitted. The hole 18 preferably matches the shape of the cross-section of the piston 30a. The hollow piston 30a is designed and constructed in such a way that it can easily move back and forth between the two chambers 40, 41. The hollow piston 30a slides through an appropriately fitted seal (e.g., an o-ring) 22, which is installed in such a way in the hole 18 that substantially no liquid or gas travels between the piston 30a and wall 16 to or from the chemical supply section 41 and the gas storage section 40. It should be understood that the piston 30a may also have non-circular, cross-section geometries (e.g., rectangular or oval), and its internal cavity or channel 34 may be subdivided into multiple channels (i.e., the piston 30a may include internal support walls or structures (not shown)).

In the embodiment of FIG. 2A, the gas storage chamber 40 is defined by the partition 16, an elastic or "springed" diaphragm 50a, and possibly a portion of a body 78 of the gas generator 10a. The gas storage chamber 40 may have one or more gas outlets 14 by which the generated gas 43 can be controllably released to the fuel cell 11 or other gas consuming system, e.g., hydrogen gas combustion engine. The minimum maximum volume of the gas storage chamber 40 may be determined based upon the transient response required. Thus, the volume of gas necessary for the gas storage chamber 40 to be able to store can be determined by techniques well known in the art.

The reference pressure chamber 26 can be vented via a vent 27 to atmospheric pressure or other reference pressure. The reference pressure, which sets the absolute operating pressures of the gas generator 10, applies a constant opposing force to the elastic diaphragm 50a. The elastic diaphragm 50a is sealed at peripheral seals 29 at its periphery to prevent product gas in the gas storage chamber 40 from leaking into the reference pressure chamber 26. In this embodiment, the elastic diaphragm 50a expands and contracts as a function of differential pressure between the gas storage chamber 40 and reference pressure chamber 26.

The piston 30a is attached to the elastic diaphragm 50a and extends into and withdraws out of the chemical supply chamber 41 as the elastic diaphragm 50a contracts and expands, respectively. A spring 65 may supply a biasing force to the elastic diaphragm 50a, and, in turn, apply biasing force to the piston 30a to bias the elastic diaphragm 50a with a force. Further details of how pressures and the spring force affect gas generation are presented below in reference to a continued description of FIG. 2A and a description of FIGS. 4A-4C.

Figure 3:
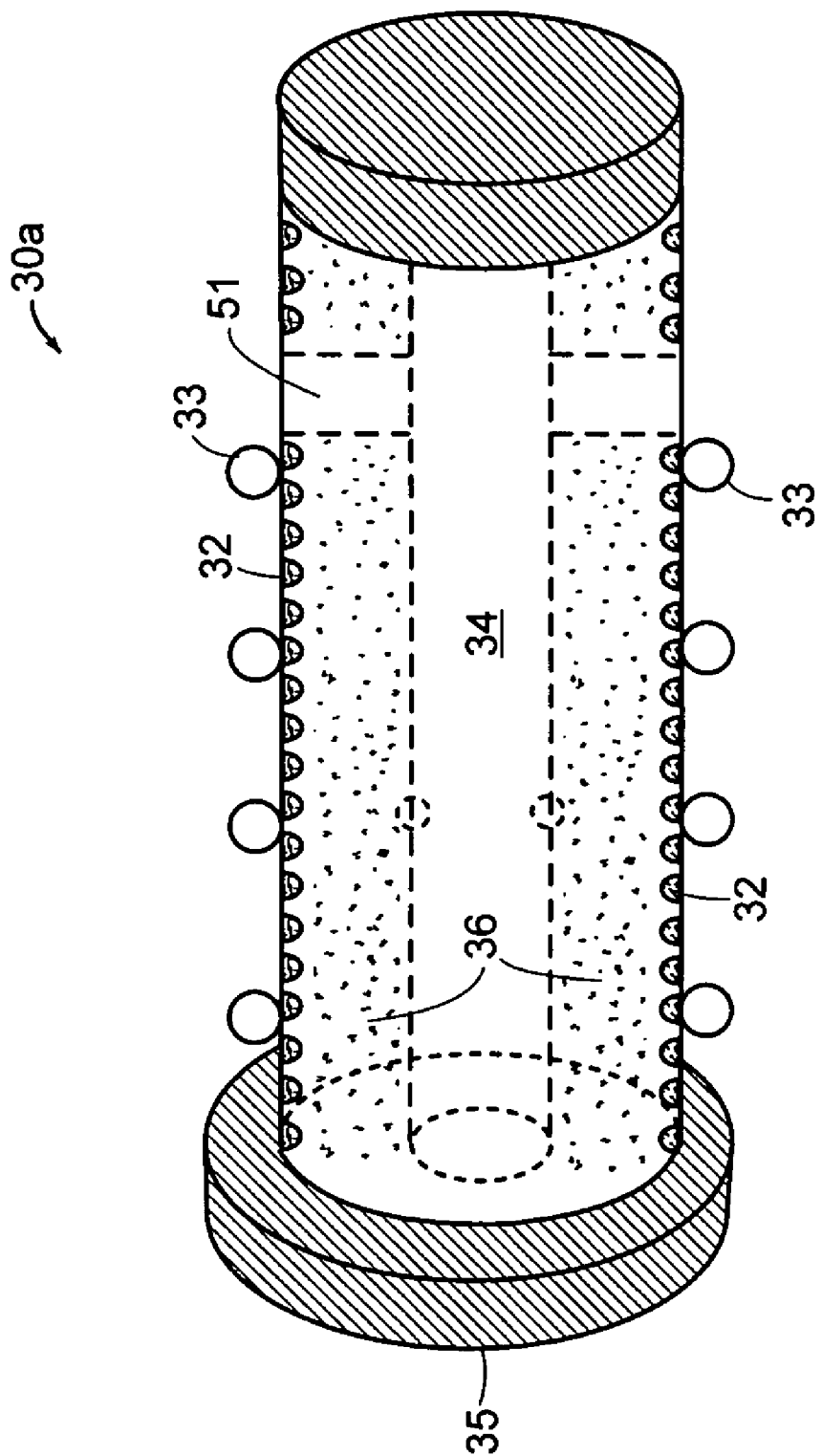
FIG. 3 is a detailed mechanical diagram of an element (e.g., piston) in the gas generator of FIG. 2A used to move catalyst into and out of a chemical supply to generate gas.

Before those descriptions, further details of the piston 30a and catalyst 32 associated therewith is presented in reference to FIG. 3.

FIG. 3 is a close-up view of the hollow piston 30a of FIG. 2A. The hollow piston 30a may be constructed of, covered with (e.g., a sleeve), or coated with a gas permeable structure 36 (e.g., a film, membrane, or other appropriate porous material) of the type that allows hydrogen gas (or in a general sense, any gas of interest) to pass through it. However, water, water vapor, or dissolved salts, such as $NaBH_4$, $NaBO_2$, or $NaOH$ are unable to pass through the gas permeable structure 36. In other words, the gas permeable structure 36 surrounding the hollow piston 30 is more permeable to hydrogen gas molecules (for example) than to molecules of water or $NaBH_4$. Thus, any hydrogen gas generated in the chemical supply chamber 41 preferentially permeates through this gas permeable structure 36. Gas exit holes 51 are provided on the right side of the piston 30a to exhaust generated gas 43 from the cavity 34 to the gas storage chamber 40.

Examples of suitable gas permeable structures 36 for hydrogen gas, such as palladium metal foil, are well known in the art. Other examples include, but are not limited to, polymer materials, such as polypropylene that is deliberately etched to allow small molecules, such as hydrogen gas (or any appropriate gas), to permeate. Still other examples include porous gas permeable polymers, such as PBO (polyphenylene-2,6-benzobisoxazole), or PVDF (polyvinylidene fluoride). Alternatively, materials such as silicone rubber may be used.

Continuing to refer to FIG. 3, the hollow piston 30a is covered with or comprises hydrogen gas permeable features (not shown), such as holes or pores. The gas permeable features may be selectively coated or embedded with a thin layer of a selected catalyst 32. In other embodiments, the catalyst 32 may be applied to the piston's lateral surface(s) alongside or near the gas permeable features.

In yet another embodiment, the selected catalyst 32 may be formed on or coupled or deposited adjacent to the gas permeable structure 36 such that the catalyst 32 is in close proximity to or covers pores of the gas permeable structure 36.

The piston's chemical supply side end 35 is left uncoated or covered with a non-catalytic material 35 to prevent gas generation when the piston 30a is fully retracted from the chemical supply 42.

The surface of the gas permeable structure 36 or piston 30a may be specially designed with "dimples" or other recessed patterns that support the catalyst 32 in a manner that makes the surface of the structure 36 or piston 30a smooth. A smooth surface of the gas permeable structure 36 or piston 30a forms and maintains a tight seal with the o-ring 22 (FIG. 2A) to maintain separation of the contents of the chemical supply chamber 41 and the gas storage chamber 40. The location of the catalyst 32 and the gas permeable structure 36 may be co-located so that gas bubbles 33, formed as a result of the chemical reaction between the chemical supply 42 and catalyst 32, find their way quickly via pressure differential to the gas permeable structure 36. In this embodiment of the piston 30a, the hydrogen gas in the gas bubbles 33 flows through the pores to the hollow cavity 34 in the piston 30a.

The particular type of catalyst 32 selected is of the type known to catalyze the decomposition of $NaBH_4$ solutions. In a general sense, any gas generating catalyst may be selected. Examples of catalysts include Ruthenium (Ru), Rhodium (Rh), Palladium (Pd), Iridium (Ir), Platinum (Pt), Rhenium (Re), and Nickel (Ni) metals, combination of metals, or metal borides. These catalysts can either be used alone or in combination with each other, as is well known in the art. Alternatively, the gas permeable structure 36 may be made of a metal or any other material that is not only permeable to hydrogen gas but is also catalytic towards decomposition of NaBH₄ solutions. Examples of such structures 36 include transition metal films with catalytically active exterior surfaces, such as Palladium, Palladium alloys, or any layered films with hydrogen gas permeable structure 36 and a surface that is itself catalytic active towards NaBH₄ decomposition.

Referring again to FIG. 2A, the catalyst coated, hollow piston 30a is freely movable between the chemical supply chamber 41 containing aqueous NaBH₄ solution 42 and the gas storage chamber 40 containing generated gas 43. The hollow piston 30a can either be positioned so that it is entirely in the chemical supply chamber 41, entirely in the gas storage chamber 40, or somewhere in-between the two chambers 40, 41.

The gas generator 10a described herein may be constructed with a sponge-like absorbent material (not shown) deliberately placed in the gas storage chamber 40 to absorb (or even neutralize) any NaBH₄ solution (or any other condensed liquid) that leaks or otherwise passes through from the chemical supply chamber 41.

The hollow piston 30a or the partition 16 is designed to prevent fuel from leaking into the gas storage chamber 40 or otherwise improve performance. For example, as suggested above, the left end 35 of the piston 30a (i.e., the end that is inserted into the NaBH₄ solution 42) is sealed with a solid impermeable material 35 or a separate element, which is sometimes referred to as an end cap 35. The impermeable material 35 or end cap 35 prevents NaBH₄ solution from entering the hollow piston 30a and passing through to the hydrogen gas storage chamber 40. The impermeable material 35 or end cap 35 also helps prevent leakage of the chemical supply 42 to the gas storage chamber 40 when the piston 30a is fully retracted (i.e., when the piston 30a is completely out of the NaBH₄ solution 42 during zero (or very low) hydrogen gas demand).

As also described above, appropriate seals 22 (e.g., o-rings or other suitable sealing material) may be installed in the partition hole 18 to prevent chemical supply leakage through two paths to the gas chamber, where the two paths are (i) along the lateral surface of the piston 30a and (ii) between the seals 22 and the partition 16. Additionally, the piston 30a can be designed to slide through or pass adjacent to a brush 13 or other flexible device that, by moving against the piston 30a, prevents or reduces solid products from adhering to or building-up on the piston 30a. This anti-fouling action effectively extends catalyst lifespan. Having a smooth surface on the piston 30a against which the brushes 13 contact improves their performance.

Other brush designs may also be employed to provide anti-fouling action. It should be understood that the brushes 13 do not impose a significant resistance on the movement of the piston 30a.

In operation of the gas generator 10 illustrated in FIG. 2A, the piston 30a is attached to the elastic diaphragm 50a and, therefore, moves in response to the pressure in the gas storage chamber 40. A constant resistive force is applied in a right-to-left direction by the pressure in the reference pressure chamber 26. The reference pressure chamber 26 may also contain a spring 65 that augments the reference pressure force directed to the elastic diaphragm 50a. So, if the reference pressure chamber 26 is not vented, the confined inert gas stored therein acts like an air spring. Thus, as the piston 30a moves increasingly to the right by gas pressure that increases within the chemical supply 42 as a result of its reacting with the catalyst 32, the elastic diaphragm 50a or spring 65 increasingly resists the hollow piston 30a.

Figure 4A:
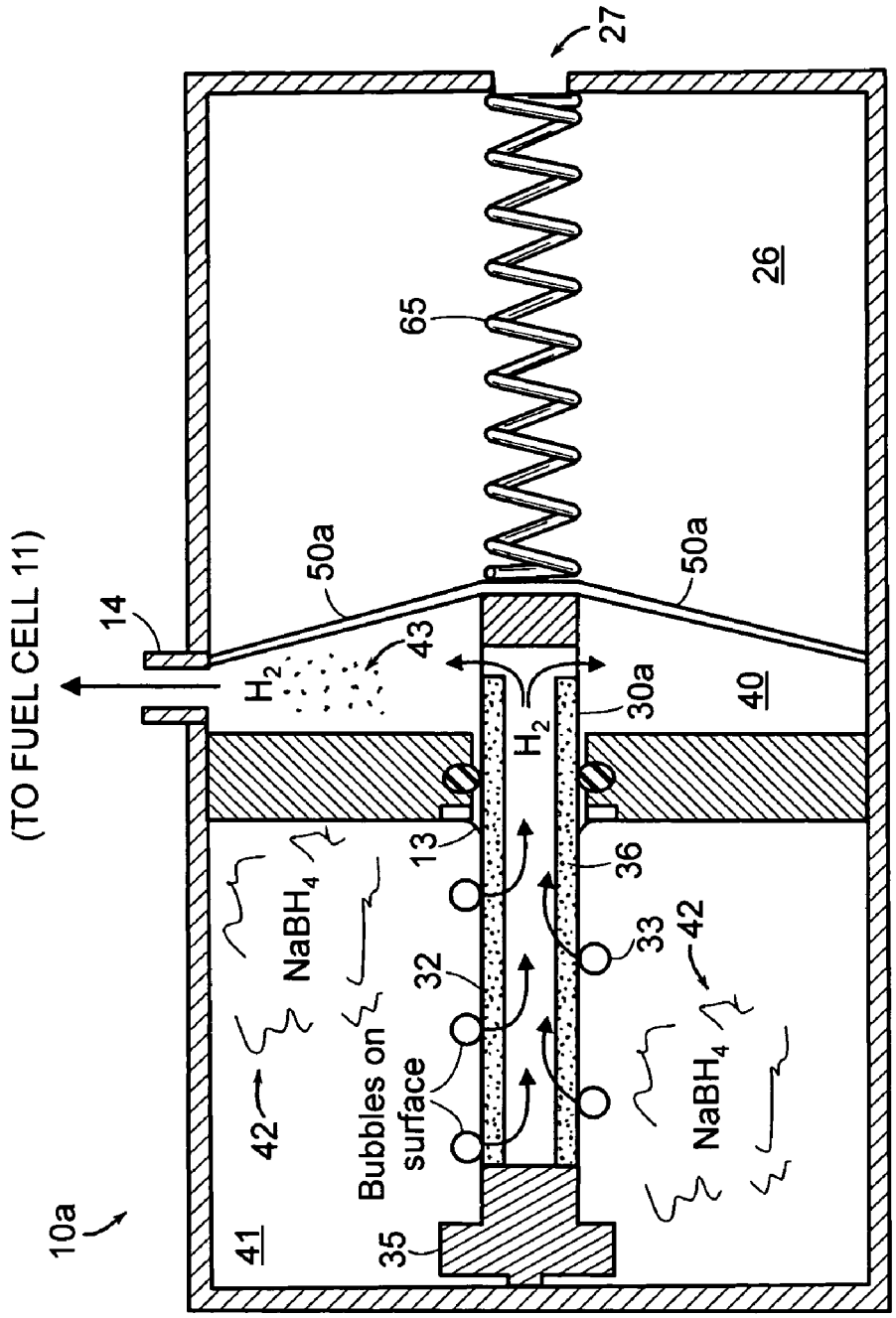
FIGS. 4A-4C are schematic diagrams illustrating operation of the gas generator of FIG. 2A.
Figure 4B:
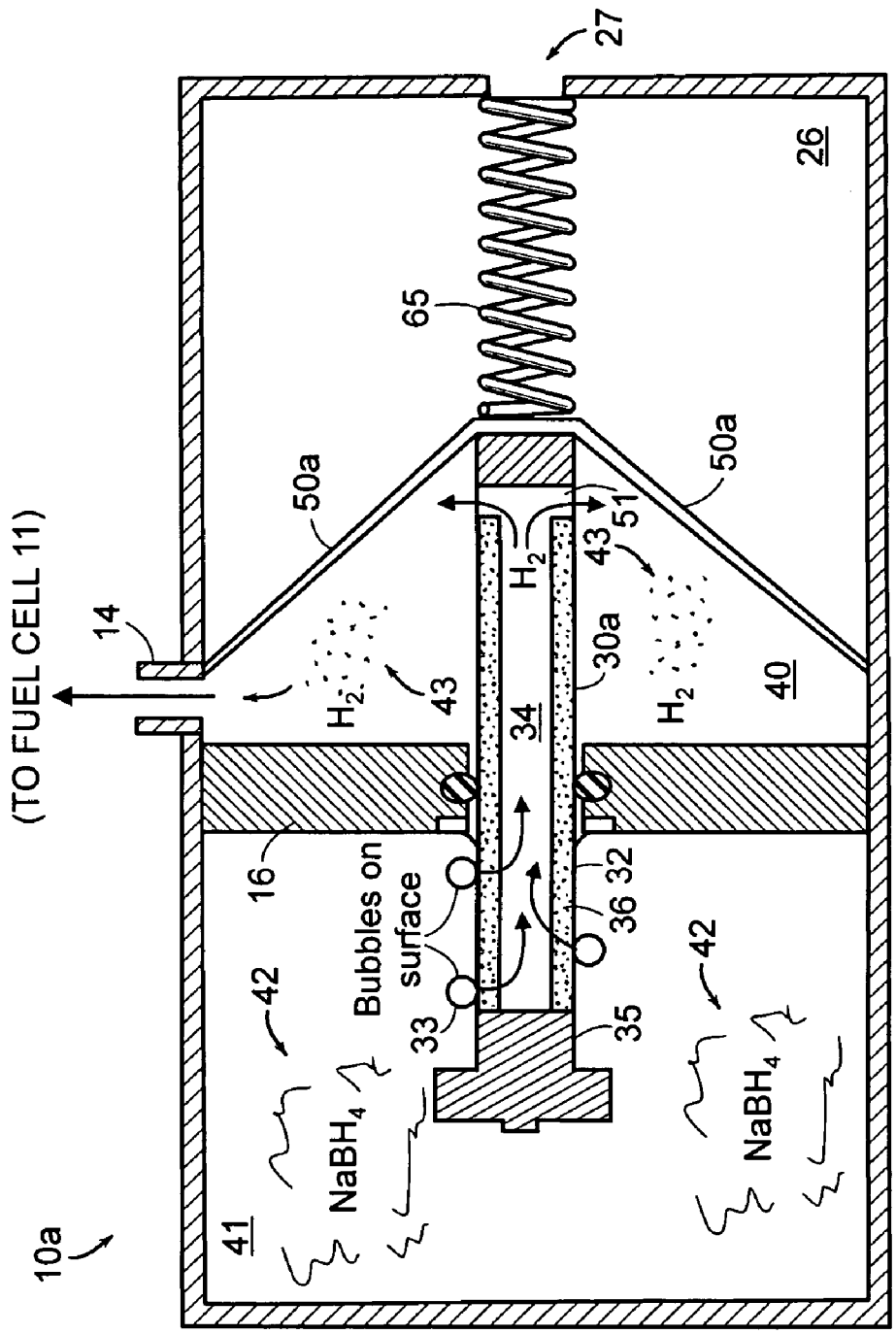
Figure 4C:
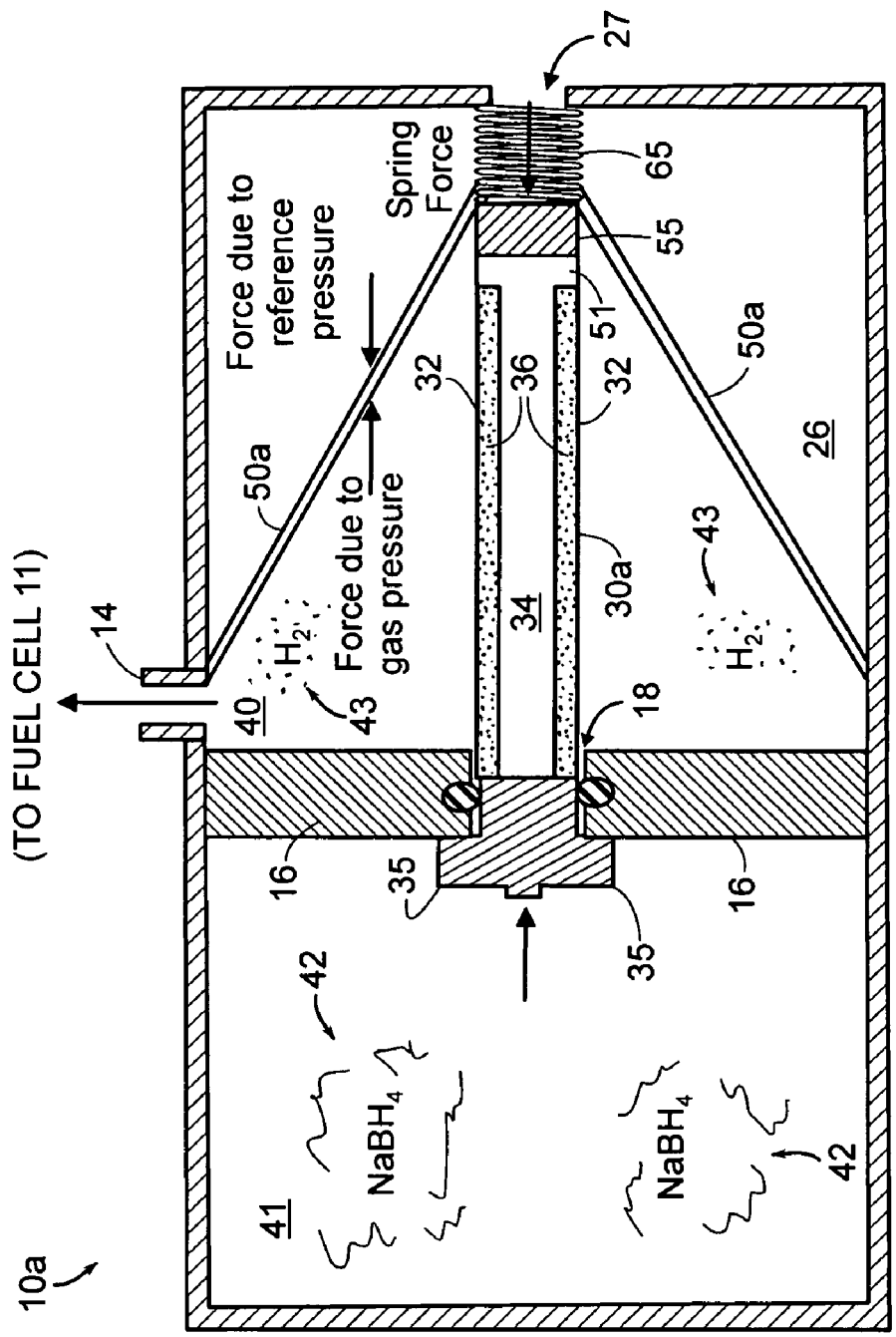

Before describing FIGS. 4A-4C, which further illustrate operation of the self-regulating gas generator 10a of FIG. 2A, a brief description of a start-up process for the embodiments of the gas generator 10a illustrated in FIG. 2A is presented. The start-up process now described also applies to FIG. 2B.

Referring to FIG. 2A, before initial use, the pressure of the chemical supply 42 is ambient, which prevents chemical supply leakage during storage. Also, the chemical supply 42 is kept separated from the catalyst rod 30a so that no gas is generated. In a first shipping configuration scenario, this is accomplished by perhaps shipping the gas generator 10a with the piston 30a fully translated out of the chemical supply chamber 41 in a locked position through use of a locking pin (not shown), other suitable mechanism(s), or, for example, rotating the piston 30a to a "locking" position. Upon unlocking the piston 30a, the force due to the spring 65 acting on the piston 30a causes the piston 30a to translate, from right-to-left, into the chemical supply 42.

In a second shipping configuration scenario, rather than shipping the gas generator 10a with the piston 30a locked in a position that keeps the catalyst 32 external from the chemical supply 42, the chemical supply 42 may be inert before use due to a separation of chemical supply components. In this second shipping configuration scenario, the chemical supply components are combined just before use by perhaps breaking a separation membrane (not shown) or crushing or adding chemical pellets which ultimately mix to form the active chemical supply 42. It should be understood that any number of other shipping configurations are possible.

Referring to the second shipping configuration scenario, the catalyst rod 30a may be shipped in its fully extended position (i.e., to the left due to the force of the spring 65 exerting a right-to-left force on it) since the chemical supply is inert. Once the chemical supply is activated and the catalyst rod 30a is fully extended into the chemical supply 42, product gas is generated rapidly.

At this point, the external device 11 demands zero amount of gas. Since the chemical fuel pressure is originally ambient, there is no differential pressure across the gas permeable structure 36 on the hollow piston 30a to force the generated gas through the hollow rod 30a and into the gas storage chamber 40. So, the generated gas "foams off" of the catalyst rod 30a and floats to the top of the chemical supply chamber 41. Because the generated gas stays in the chemical supply chamber 41, the pressure in the chemical supply chamber 41 increases. As the pressure in the chemical supply chamber 41 increases, a pressure begins to be exerted on the left end 35 of the rod 30a, which causes it to translate to the right against the resisting spring 65. The spring 65 incrementally removes catalyst from the chemical supply 42. Simultaneously, the differential pressure across the permeable structure 36 increases until the generated gas begins to preferentially flow into the catalyst rod 30a rather than foaming into the chemical fuel chamber 41. The generated gas 43 begins to increase the pressure in the gas storage chamber 40, which, in turn, exerts a force, left-to right, on the elastic diaphragm 50a and, therefore, the piston 30a. As the pressure in the chemical fuel chamber 41 further increases and more gas flows into the gas storage chamber 40, there is a point at which the piston 30a positions the catalyst 32 fully withdrawn from the chemical supply 42. Since there is no generated gas 43 demanded by the fuel cell 11 before switching it on, the gas generator 10a is now in its "primed" state ready to deliver regulated gas on demand.

The start-up sequence of the other embodiments, FIG. 5A, 5B, 6A, 7, and 8 is similar to the start-up sequence of FIG. 2A with the exception that they do not utilize a hollow rod 30a and diaphragm 50a. For these solid rod 30b instances, the same separation of chemical supply 42 and catalyst 32 is required before initial use. Upon initial activation, the catalyst rod 30a is fully extended into the chemical supply 42 by the spring 65, and the chemical supply pressure is the same as the reference pressure. Generated gas is evolved and floats through the chemical supply 42 to the top of the chemical supply chamber 41, ultimately resting against the permeable structure 36. The gas then flows through it into the gas storage chamber 40 due to the increasing differential pressure between the chemical supply 42 and the gas storage chamber 40. As the chemical supply pressure increases, the catalyst rod 30b translates left-to-right and ultimately out of the chemical supply 42, which stops the gas generation. Since there is no gas demanded by the fuel cell 11 before switching it on, the gas generator 10 is now in its "primed" state, ready to deliver regulated gas on demand.

Referring now to FIG. 4A, the piston 30a may be shipped in a "locked" position, meaning the piston 30a (and catalyst 32) is entirely external from the $NaBH_4$ solution 42, as described above in reference to the first shipping configuration scenario. A user sets the piston 30a in an "unlocked" position by disengaging a latch, detent, or other securing mechanism (not shown) to allow the piston (and catalyst 32) to enter the $NaBH_4$ solution 42, which begins a self-regulating process, described immediately below.

Continuing to refer to FIG. 4A, the start of the self-regulating process begins with the piston 30a initially positioned entirely in the chemical supply chamber 41. As described above in reference to the start-up sequence for FIG. 2A, upon exposure of the catalyst 32 on the piston 30a to the $NaBH_4$ solution 42, hydrogen gas is catalytically generated. During this hydrogen gas generation step, hydrogen gas bubbles 33 form in the $NaBH_4$ solution 42 near the catalyst 32, coalesce, and contact the gas permeable structure 36. These bubbles 33 are driven through the gas permeable structure 36 by differential pressure. Then, after the gas exits the bubbles 33 and enters the hollow piston 30a, the gas 43 travels through the hollow piston 30a and enters the hydrogen gas storage chamber 40 of the gas generator 10a.

The depth to which the catalyst coated piston 30 is immersed in the aqueous $NaBH_4$ solution 42 ultimately controls the hydrogen gas generation rate. If the catalyst coated piston 30a is pushed entirely into the chemical supply chamber 41 (FIG. 4A), the hydrogen gas generation rate is at its maximum since a large amount of catalyst surface area is exposed to the $NaBH_4$ solution 42.

In FIG. 4B, the catalyst coated, hollow piston 30a is positioned between the chemical supply chamber 41 and gas storage chamber 40. In this case, the hydrogen gas generation rate is between the maximum hydrogen gas generation rate and zero and represents a typical operating condition that accommodates fluctuations in gas demand.

In FIG. 4C, the piston 30a is entirely in the gas storage chamber 40. In this case, no hydrogen gas 43 is generated from $NaBH_4$ solution 42 since no catalyst 32 is exposed to the $NaBH_4$ solution 42. As long as the piston 30a remains fully in the gas storage chamber 40, the hydrogen gas generation rate remains at zero.

Now that the basic operating principles of the gas generator 10 have been described, a detailed description of a feedback system, and how the feedback system of the gas generator 10 operates, is presented.

In general, the feedback system utilizes force generated in part by pressure in at least one of the chambers 40, 41 to position the catalyst 32 in the chemical supply 41 to regulate rate of generation of the generated gas 43. The feedback system may include a subset of the following components in some embodiments: piston 30a, elastic diaphragm 50a, spring 65, reference pressure chamber 26, gas storage chamber 40, or chemical supply chamber 41.

Referring to FIG. 4C, the position of the piston 30a is determined by an equilibrium of four forces: (1) a force exerted left-to-right on the left end 35 of the piston 30a due to pressure in the chemical supply chamber 41; (2) pressure of the gas 43 in the gas storage chamber 40 acting from left-to-right on the elastic diaphragm 50a, which, in turn, exerts force on the piston 30a from left-to-right; (3) pressure of the reference pressure chamber 26 acting from right-to-left on the elastic diaphragm, which, in turn, exerts force on the piston 30a from right-to-left; and (4) force exerted on the piston 30a by the spring 65.

Other embodiments described herein may include the same or other components as part of the feedback system. Equivalent structures or functions known in the art may be used in place of or in concert with the structures or functions composing the feedback system as described herein.

Continuing to refer to the operation of the gas generator 10a of FIGS. 2A and 4A-4C, when demand exists for hydrogen gas (i.e., the fuel cell or other hydrogen gas consuming device is under load and is consuming hydrogen gas), the gas pressure in the gas storage chamber 40 decreases. The lower hydrogen gas pressure causes the elastic diaphragm or flexible diaphragm 50a to be less extended and therefore move to the left (i.e., towards the chemical supply chamber 41), which reduces the volume of the gas storage chamber 40. As the flexible wall 50a moves towards the left, it simultaneously pushes the catalyst coated piston 30a towards the left and into the $NaBH_4$ solution 42. Since high surface area catalyst 32 on the hollow piston 30a is now exposed to $NaBH_4$ solution, the hydrogen gas generation rate increases.

Hydrogen gas, generated by action of the catalyst 32 in the $NaBH_4$ solution 42, rapidly diffuses through the gas permeable structure 36, through the hollow piston 30a, and towards the hydrogen gas storage chamber 40. Hydrogen gas pressure then rapidly builds-up in the hydrogen gas storage chamber 40. As long as the generated hydrogen gas 43 is continuously utilized by the fuel cell 11 (FIG. 1) or other hydrogen gas consuming device, the hydrogen gas pressure in the reference pressure chamber 26 remains low. A significant portion of the catalyst coated piston 30 remains within the chemical supply chamber 41, and the generator 10a continues to generate hydrogen gas at a rate proportional to the load.

When, however, the load on the fuel cell 11 decreases and the hydrogen gas generated is not being used at a rate equal to the rate of generation, unused hydrogen gas 43 accumulates in the gas storage chamber 40. The increased hydrogen gas pressure in the hydrogen gas storage chamber 40 (relative to the pressure in the chemical supply chamber 41) forces the elastic diaphragm 50a to move towards the reference pressure chamber 26. As the elastic diaphragm 50a moves to the right, it simultaneously pulls the catalyst coated piston 30a out of the $NaBH_4$ fuel solution 42 and, thus, the amount of catalyst 32 exposed to $NaBH_4$ solution 42 decreases. This slows the hydrogen gas generating reaction until it matches the rate of use and, when the gas demand is zero, the hydrogen gas generating reaction slows to a stop. Thus, the mechanical feedback system in the gas generator 10 includes very few moving parts and behaves in a self-regulating manner to rapidly regulate hydrogen gas generation.

When the load on the fuel cell 11 increases again and the fuel cell (or other hydrogen gas utilizing device) begins to use hydrogen gas again, hydrogen gas volume and pressure in the gas storage chamber 40 begins to decrease. This reduced pressure allows the elastic diaphragm 50a to once again move back towards the left. This movement simultaneously pushes the catalyst coated, gas permeable, hollow piston 30a back into the $NaBH_4$ solution 42, thereby increasing hydrogen gas generation rates once again, as described above. This movement of the catalyst coated piston 30a in and out of the $NaBH_4$ solution 42 is self regulating. The movement of the piston 30a in and out of the solution has the added advantages of agitating the chemical supply to provide a uniform solution composition and performing a cleaning action to remove reaction residue or other accumulated material (not shown) from the piston 30a.

It should be understood that the principles of the present invention are not limited solely to the embodiments described above. Other mechanical and structural embodiments may accomplish the same self-regulating, gas generating function. These other embodiments may use a piston or suitable moveable element coated with a catalyst, a gas permeable structure, and a pressure feedback system. The other embodiments and components therein may differ from the embodiment of FIG. 2A in relative configurations, shapes, sizes, pressures, gas flow rates, hole designs, movement of the individual components, and other aspects. Such configurations and associated design trade-offs are understood in the art, and some are described hereinbelow.

Figure 2B:
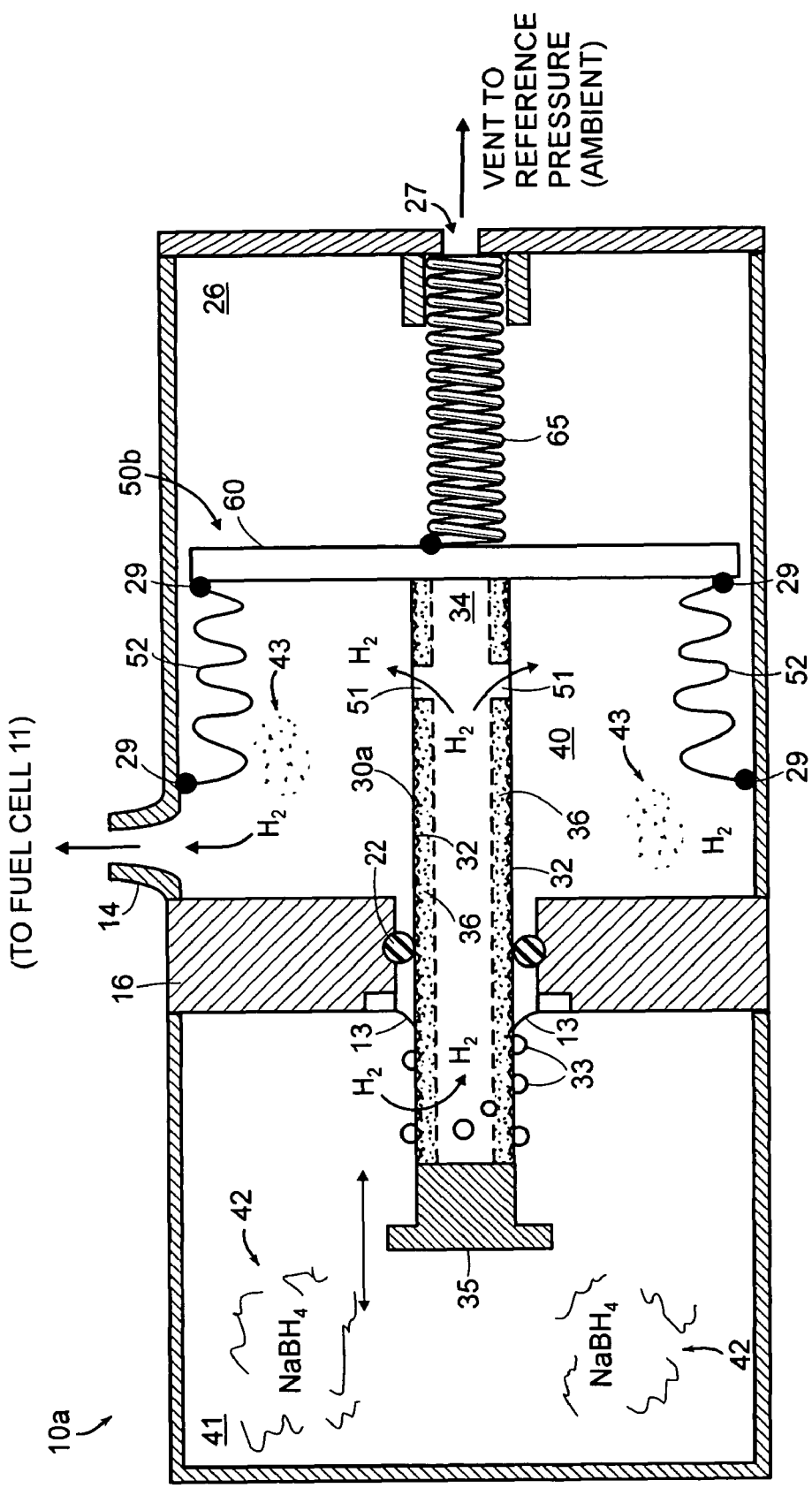
FIG. 2B is a schematic diagram of another embodiment of the gas generator of FIG. 2A.

FIG. 2B, for example, is another embodiment of the gas generator 10a of FIG. 2A. In this embodiment, the elastic diaphragm 50b includes a rigid wall 60 and flexible sealing bellows 52 with peripheral seals 29. The bellows 52 responds to pressure changes by pressing against an adjustable mechanical or gas spring 65. In another embodiment, the restorative force of the bellows 52 and pressure in the reference pressure chamber 26 may be sufficient to dispense with the spring 65. Other than differences between the elastic diaphragm 50b (FIG. 2B) and elastic diaphragm 50a (FIG. 2A), the gas generator 10 of FIG. 2B operates substantially the same as the gas generator 10a of FIG. 2A.

Figure 5A:
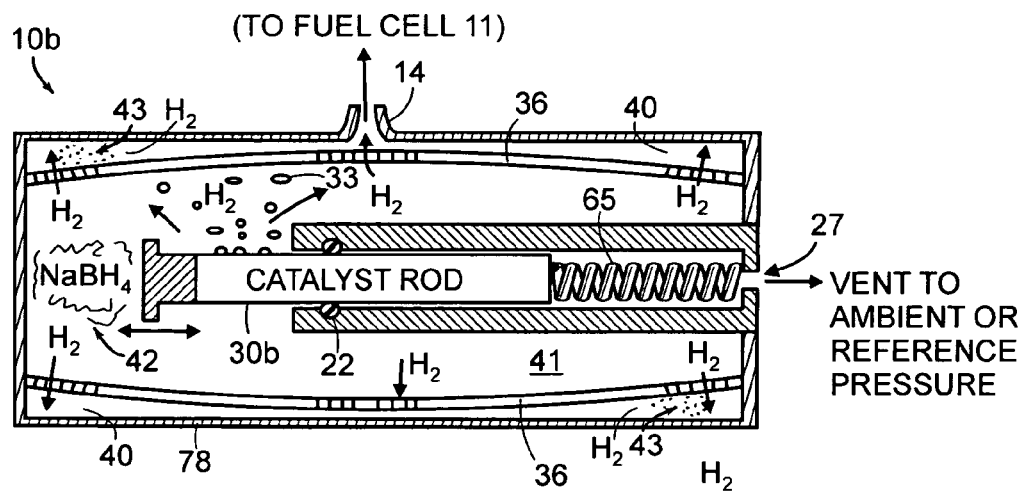
FIGS. 5A and 5B are schematic diagrams of other embodiments of the gas generator of FIG. 1.
Figure 5B:
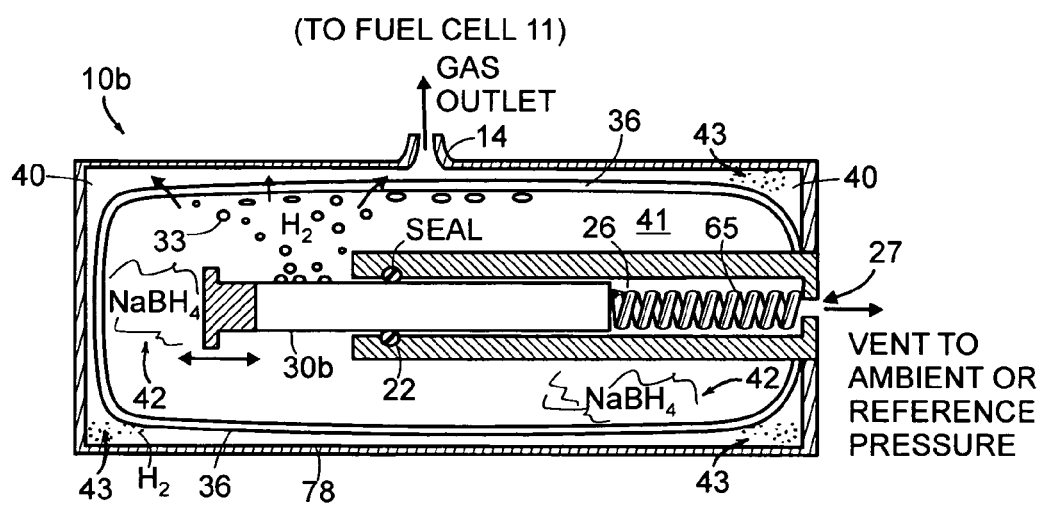

As another example, FIGS. 5A and 5B illustrate embodiments of the gas generator 10b in which the catalyst 32 is deposited on or incorporated into a solid piston 30b and a bladder, which includes the gas permeable structure 36, forms at least a portion of the chemical supply chamber 41. In these embodiments, the gas permeable structure 36 is set apart from the piston 30b at a portion of the perimeter of (FIG. 5A) or surrounds (FIG. 5B) the $NaBH_4$ solution 42. hydrogen gas bubbles 33, generated near the catalyst coated piston 30b, diffuse through the $NaBH_4$ solution 42 and permeate through the gas permeable structure 36 to enter the gas storage chamber 40.

The embodiments of FIGS. 5A and 5B may simplify device construction and operation of the gas generator 10b. Although the catalyst 32 is still associated with piston 30b, the hydrogen gas permeable structure 36 is located a distance away from the catalyst 32. Thus, in these embodiments, there is no need to construct a catalyst layer either near or on top of the gas permeable structure 36. The catalyst 32 and gas permeable structure 36 can be constructed separately. The advantage of these embodiments is not only in ease of manufacture, but also in improving hydrogen gas generation rates. As hydrogen gas bubbles 33 travel through the $NaBH_4$ solution 42 to the gas permeable structure 36, they help agitate/stir the $NaBH_4$ solution 42. This action helps remove any attached reaction products from the surface of the catalyst 33 and make the solution 42 more uniform, thus improving subsequent hydrogen gas generation.

The simplicity of the solid piston 30b embodiment of the gas generator 10b of FIGS. 5A and 5B may reduce the cost sufficiently to provide disposability. Also, these embodiments may allow for reusable gas generators that can be refilled, if desired. For example, a cylindrically shaped gas generator not only reduces manufacturing costs, but also, the chemical supply chamber 41 can be fitted with a removable screw cap (not shown). When $NaBH_4$ solution is spent, the screw cap may be unscrewed, the spent $NaBH_4$ solution emptied, and the chemical supply chamber 41 refilled with fresh $NaBH_4$ solution. Alternatively, a positive displacement injection port (not shown) can be provided on the chemical supply chamber 41 to allow displacement of spent chemical supply with fresh chemical supply.

In addition, if the gas permeable structure 36 is made of a metal (such as palladium) or other suitable heat conductor, it can also function as a heat sink to draw away any waste heat produced by the hydrogen gas generating reaction. This keeps the gas generator 10b operating temperatures low. Another advantage of this embodiment is that the hydrogen gas storage chamber 40 can be located in the periphery of the gas generator 10b (i.e., surrounding the $NaBH_4$ chemical storage chamber 41). Since more of the hydrogen gas generator's total volume is available to store $NaBH_4$ solution 42, it increases the amount of hydrogen gas that can be generated per unit volume.

In operation of the embodiments of FIGS. 5A and 5B, as pressures within the $NaBH_4$ solution 42 build up due to excessive hydrogen gas 43 being generated and not utilized by the hydrogen gas consuming device 11 (FIG. 1), the catalyst coated piston 30b is compressed against the adjustable spring 65, and the piston 30b is forced out of the $NaBH_4$ solution 42. This acts to stop or limit hydrogen gas generating rates. These embodiments do not rely on the flexibility of the gas permeable structure 36. Depending on the adjustable tension in the spring 65 behind the piston 30b, pressures within the $NaBH_4$ solution 42 are sufficient to push the catalyst coated piston 30b out of the solution 42 to slow the reaction rate.

The embodiments of FIGS. 5A and 5B have the added advantage that the catalyst coated piston 30b can be easily sealed within a cylindrical body 78. This prevents accidental leakage of $NaBH_4$ solution 42 or hydrogen gas through the piston 30b. The tension of the spring 65 pushing against the piston 30b can either be adjusted at the time of manufacture or manually adjusted as needed for the particular application, desired gas pressures, or required gas flow rates. Various manual adjustment mechanisms known in the art may be employed to adjust the compression or tension of the spring 65.

Figure 6A:
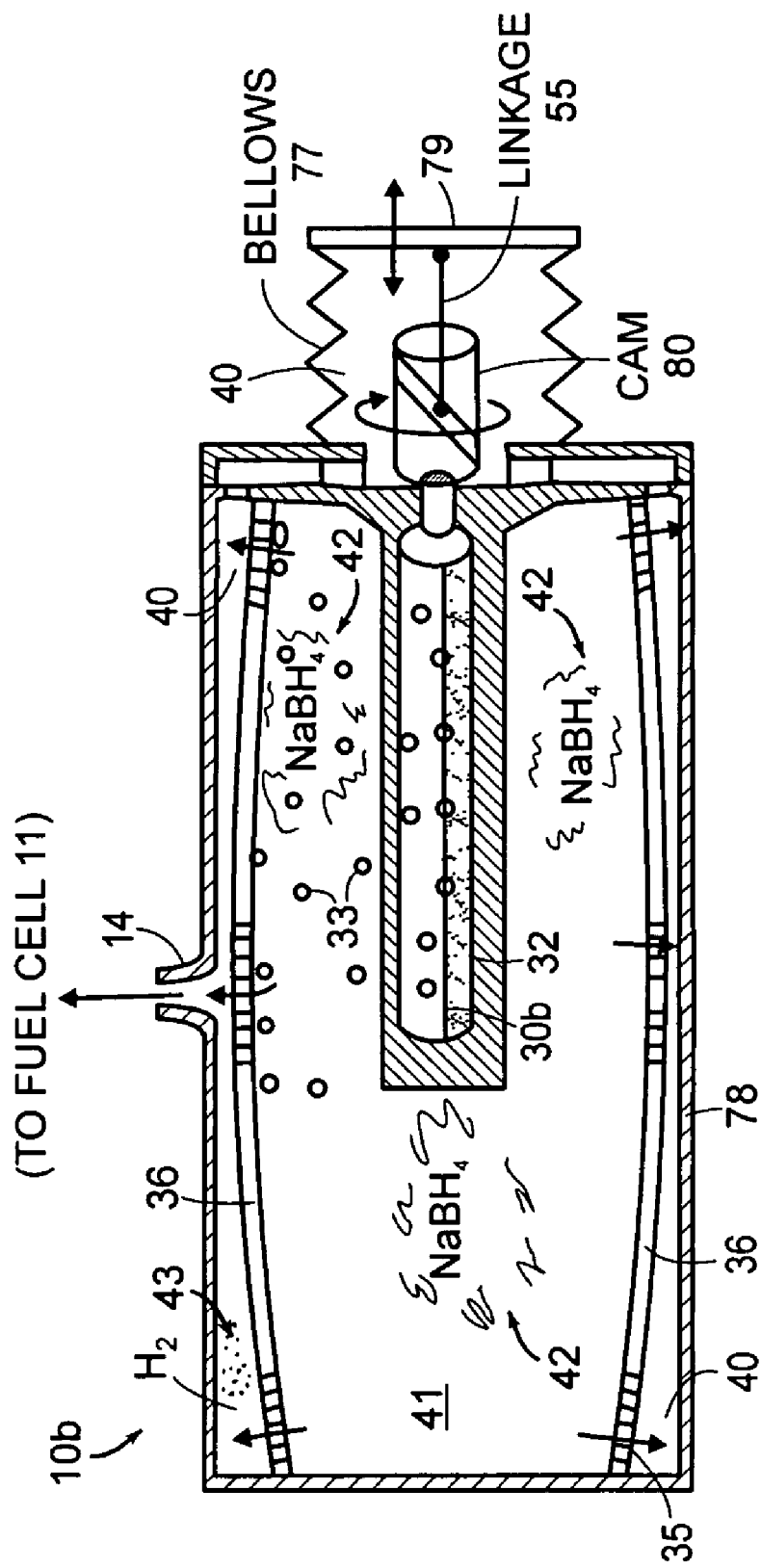
FIG. 6A is a schematic diagram of yet another embodiment of the gas generator of FIG. 1.

FIG. 6A is a mechanical schematic diagram of another embodiment of the gas generator 10. This embodiment is similar to the embodiment of FIGS. 5A and 5B, but, instead of having a piston 30b that exposes the catalyst 32 to the chemical supply 42 by moving the piston 30b in and out of the chemical supply 42, the element 30b, in this case a rotating rod 30b, rotates to alter the amount of catalyst exposed to the chemical supply 42. To create turning motion to rotate the rod 30b, the rod 30b is mechanically connected to a cam 80. The cam 80 is connected via a linkage 55 to a stiff wall 79 of a bellows 77. The bellows 77 is designed to react to pressure in the gas storage chamber 40, which extends along the outside of the elastic diaphragm 50c and into the bellows 77.

In operation, when the fuel cell 11 or other gas consuming device draws more generated gas 43 for production of electricity, for example, the pressure in the gas storage chamber 40 decreases, causing the bellows 77 to contract, which rotates the rotating rod 30b to expose more catalyst to the chemical supply 42. When the fuel cell 11 or other gas consuming device draws less generated gas 43, the pressure in the gas storage chamber 40 increases, causing the bellows 77 to expand and, in turn, causes the cam 80 to rotate the rod 30b to expose less catalyst 32 to the chemical supply 42. This causes the production of gas bubbles 33 and, in turn, pressure in the gas storage chamber 40 to slow and ultimately reach equilibrium commensurate with the amount of generated gas 43 being drawn.

It should be understood that ball bearings, gas bearings, or other techniques for allowing the rotating rod 30b and cam 80 to turn smoothly and with minimal resistance may be employed. Also, similar to the seal 22 in other embodiments, the rotating rod 30b embodiment of FIG. 6A may include an elongated seal (not shown) to prevent the chemical supply 42 from entering a chamber in which the rotating rod 30b resides. Anti-fouling brushes (not shown) may also be employed to prevent product and other materials from building-up on the rod 30b or catalyst 32.

FIGS. 6B and 6C illustrate alternative rotating rod embodiments that may be employed in the gas generator of FIG. 6A. In FIG. 6B, the rotating rod 30a is shown by way of a cross-sectional axial view to be a hollow embodiment, similar to the piston 30a of FIG. 2A. In this embodiment, the catalyst 32 is disposed on a gas permeable membrane 36. The catalyst 32 is deposited in dimples that are formed in the gas permeable membrane 36, as described in reference to FIG. 3. As described in reference to FIG. 2A, the generated gas 43 initially forms in bubbles 33, enters the channel 34 of the hollow piston 30a, and travels to the gas storage chamber 40. It should be understood that the embodiment depicted in FIG. 6A is changed suitably to accommodate the hollow rod 30a embodiment. It should be noted that the hollow rod 30a includes a non-catalytic and non-porous material 55, which, when exposed to the chemical solution 42, neither reacts with the chemical solution 42 nor allows the chemical solution 42 or generated gas 43 to pass therethrough.

FIG. 6C is a cross-sectional axial view of a solid rod 30b used in the gas generator 10b of FIG. 6A. The solid rotating rod 30b supports the catalyst 32, which may be associated with the solid rod 30b to any depth, and the non-catalytic and non-porous material 55. Use of the solid rod 30b is described in reference to FIGS. 6D-6F below.

Referring first to FIG. 6D, the solid rotating rod 30b is positioned in a rounded partition 16 such that the catalyst 32 is not exposed to the chemical solution 42. The seals 22 prevent the chemical solution 42 from entering the region in which the solid rod 30b resides. In the position shown, the rotating solid rod 30b does not cause gas to be generated because the catalyst 32 is not in the presence of the chemical solution 42. The angle of the rotating rod 30b may be used for shipping the gas generator 10 or for stopping gas production in the case where there is no electrical load on a fuel cell, for example.

FIG. 6E illustrates the case where some gas is being produced. In this case, the rotating rod 30b is rotated such that some catalyst is exposed to the chemical supply 42. In turn, gas bubbles 33 are produced. The gas bubbles 33 contact the gas permeable membrane at various points along the gas permeable structure 36 (FIG. 6A), and the generated gas 43 passes through to the gas storage chamber 40.

FIG. 6F illustrates a case at which maximum gas generation is required to satisfy the needs of the gas consuming device. In this case, the rotating solid rod 30b is positioned such that the catalyst 32 is exposed to the chemical supply 42 to its fullest extent allowed by the partition 16.

It should be understood that either rotating rod embodiment 30a or 30b may be a rotating sphere or other geometric shape that can support catalyst 32 to function in a similar manner as described above.

Figure 7:
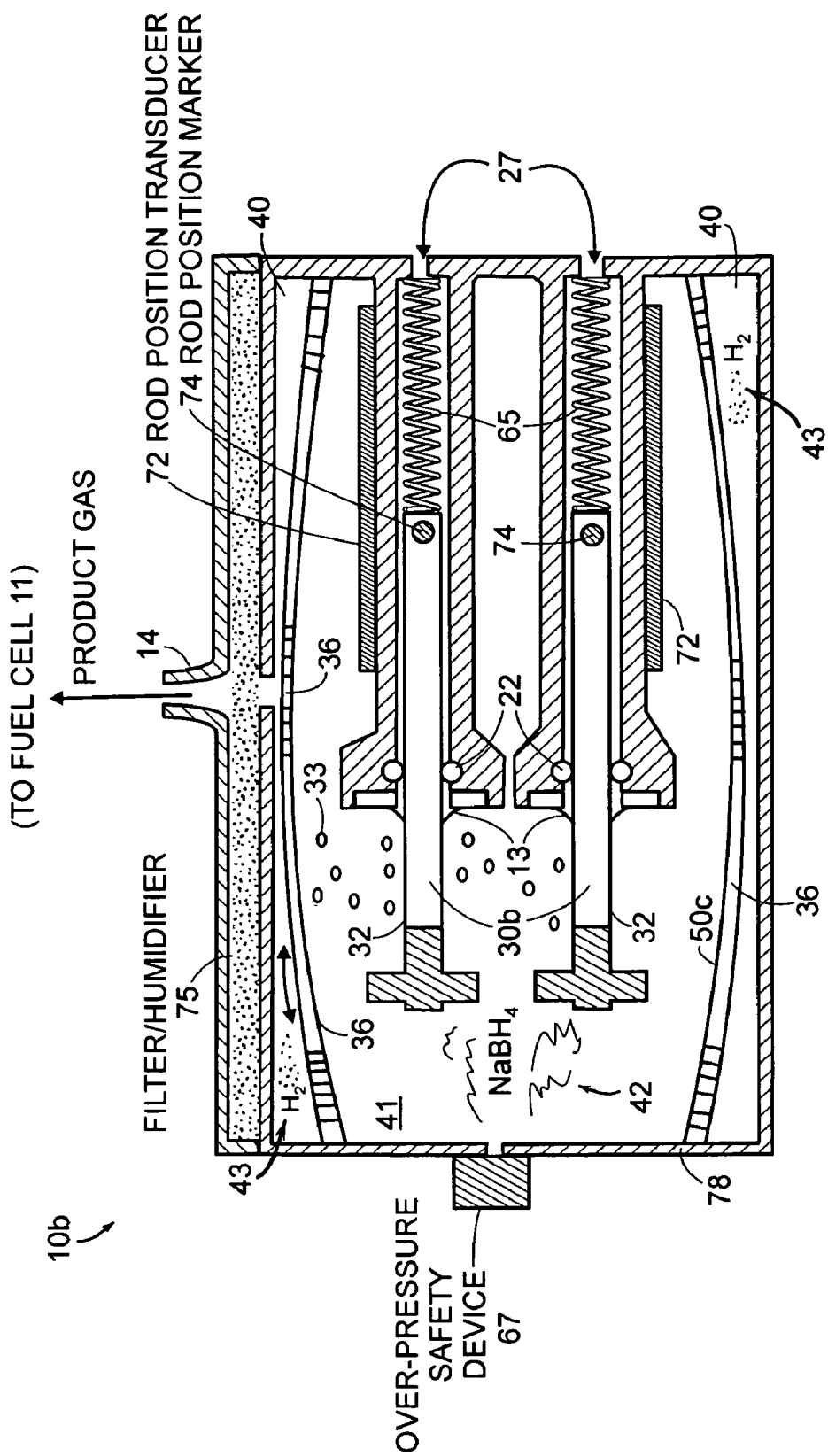
FIG. 7 is a mechanical schematic diagram of another embodiment of the gas generator of FIG. 1.

FIG. 7 is a mechanical schematic diagram of the gas generator 10b employing two solid pistons 30b that function in the same manner as the embodiment of FIG. 2B. In some embodiments, the pistons 30b move their respective associated catalyst 32 in a parallel manner into the presence of the chemical supply 42 to generate gas 43 in the chemical supply chamber 41. In alternative embodiments, only one of the pistons 30b is used until its catalyst 32 is spent, and then the other piston 30b is activated. In another embodiment, one piston 30b moves its associated catalyst 32 into the presence of the chemical supply 42 unless additional generated gas 43 is required for supplying the gas consuming device via the gas outlet 14. Other examples for operating the pistons 30b in unison or independent of one another are considered to be within the scope of the principles of the present invention.

The gas generator 10b of FIG. 7 also includes an over-pressure safety device 67. The safety device automatically exhausts some of the chemical supply 42 from the chemical supply chamber 41 in the event the chemical supply chamber 41 experiences too much pressure. The over-pressure safety device 67 may also be applied to a portion of the body 78 that surrounds the gas storage chamber 40 to relieve pressure from that chamber should an over-pressure situation occur.

The over-pressure safety device 67 may also be used as a portal to add more chemical supply 42, water, or other chemical used as a chemical supply for use in gas production. Similarly, the over-pressure safety device 67 may also be used to extract spent chemical supply 42 from the chemical supply chamber 41. The over-pressure safety device 67 may be connected to the body 78 of the gas generator 10 via mating threads, detent, clasps, or other mechanical fastening technique and may include a gasket or o-ring to prevent gas or chemical supply leakage. Alternatively, the over-pressure safety device 67 may be permanently connected to the body 78. In yet other embodiments, the over-pressure safety device 67 may be formed as an integral part of the body 78.

Another feature illustrated in the embodiment of the gas generator 10b in FIG. 7 is a filter/humidifier 75 that the generated gas 43 passes through from the gas storage chamber 40 to a gas utilizing device via the gas outlet 14. The filter/humidifier 75 may perform one or both functions. In the case of functioning as a filter, the filter/humidifier 75 may restrict substantially all but hydrogen gas from flowing therethrough. In the case of functioning as a humidifier, the filter/humidifier 75 adds water vapor or other gaseous vapor to the hydrogen gas as it traverses therethrough. The filter/humidifier 75 may be implemented in the form of a sponge-like material as known in the art.

The gas generator 10b of FIG. 7 also includes a rod position transducer 72 and a rod position marker 74 that are used to detect a position of the piston 30b. The transducer may be a Hall-effect transducer, capacitance probe, or other electromagnetic transducer capable of sensing a compatible marker 74 located on the piston 30b. In other embodiments, the transducer 72 is an optical transducer that detects the positions of the piston 30b. In such an embodiment, an optical viewing port is provided to allow the transducer 72 to "see" the marker 74 or, in some cases, the piston 30b directly. It should be understood that a wheel with an optical encoder (not shown) or other position sensing device known in the art may be employed. In each of these cases, the use of a signal that represents the position of the piston may be used to provide information to an external device (not shown) or for use in generating electrical feedback for a motor (e.g., linear voice coil motor), pump, or other device(s) (not shown) that in some embodiments positions the piston 30*b* in the chemical supply 42 such that the catalyst 32 is exposed to the chemical supply 42 by an amount sufficient to generate enough gas 43 for supplying to the gas consuming device 11. A linear voice coil embodiment may have its windings built into an area of the body 78 of the gas generator 10*b* that has a composite or other material that allows for magnetic fields to couple to a magnetic element (not shown) on the piston 30*b* for controlling the position of the catalyst 32 in the chemical supply 42. Use of devices that can assist moving the piston 30*b* are understood in the art. Implementation of such a device, position transducer 72, position marker 74, and control electronics (not shown) may change the mechanical configuration depicted in FIG. 7.

The gas generator 10*b* may also include a capacity indicator (not shown) that informs a user or machine that the gas storage chamber is reaching or has reached substantially maximum capacity. The indicator may also indicate low capacity or a range of capacities. The capacity indicator may include a dial, electronic display, lights (e.g., LED's), audible signal, wireless messaging service, or other indicators known in the art. The capacity indicator may use a pressure transducer or other transducer known in the art. Other indicators, such as a 'fuel spent' or 'catalyst spent' indicator may also be employed.

Figure 8:
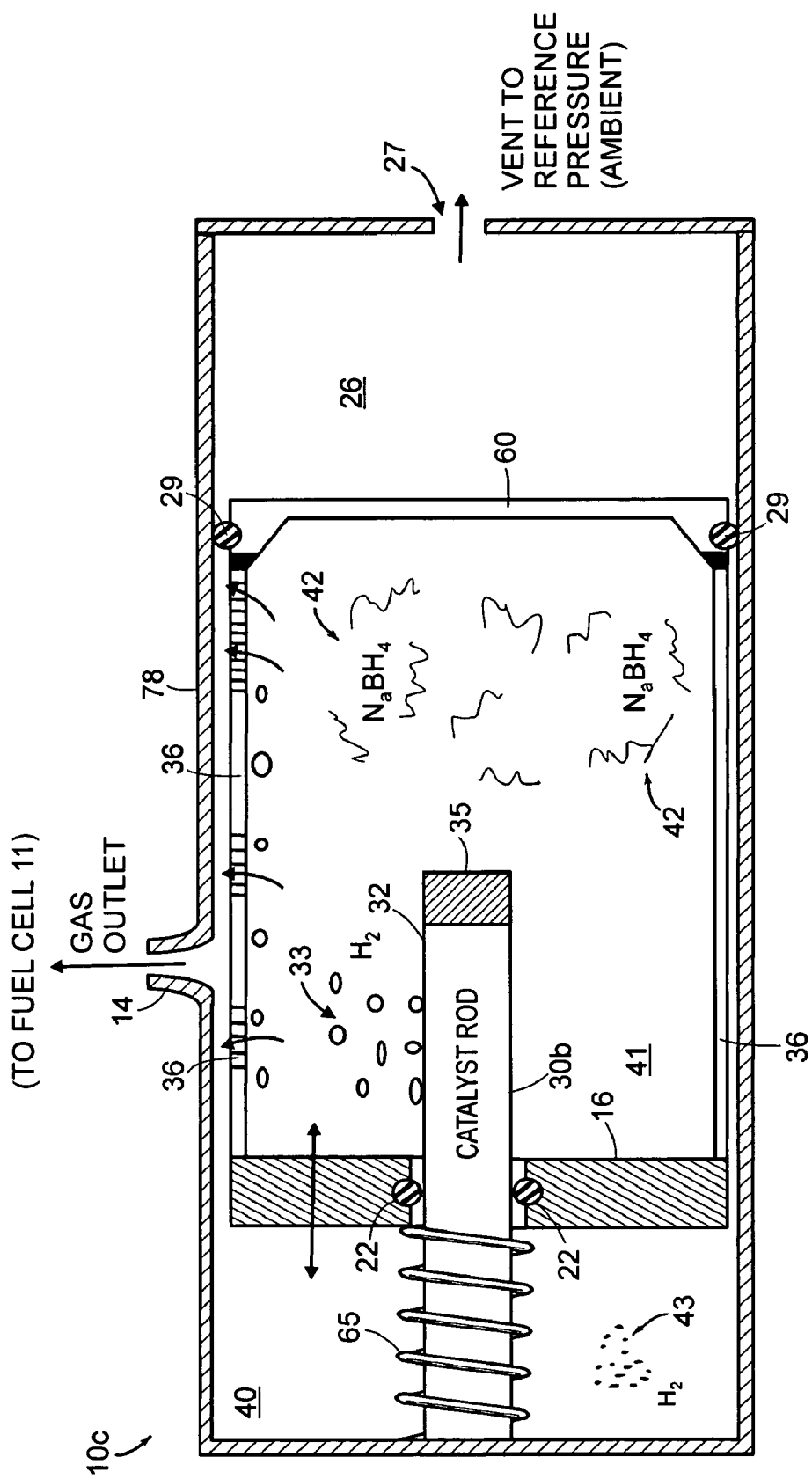
FIG. 8 is a mechanical schematic diagram of yet another embodiment of the gas generator of FIG. 1.

FIG. 8 illustrates another embodiment of the gas generator 10*c*. In this embodiment, instead of moving catalyst coated piston 30*a* or 30*b* into or out of the NaBH$_4$ solution 42 as described above, in FIG. 8, the entire NaBH$_4$ solution 42 is moved toward or away from the solid, catalyst coated piston 30*b*, which remains fixed in one embodiment. Since NaBO$_2$ is formed in the presence of a larger volume of NaBH$_4$ solution (where the NaBO$_2$ solubility remains high), the potential for catalyst fouling is minimized. The catalyst life is thus markedly extended. It should be understood that in other embodiments, the piston 30*a* or 30*b* may also move in a manner as described above; thus, a differential motion between the NaBH$_4$ solution 42 and catalyst coated piston 30*b* may be provided.

The gas permeable structure 36 can be on portions of the elastic diaphragm 50*c* or be the entire elastic diaphragm 50*d* as in FIG. 5B. The embodiment of FIG. 8 may be constructed in a cylindrical body 78 and with removable screw caps (not shown) on the ends. In this design, not only can the NaBH$_4$ solution 42 be replaced when it has been spent, but the catalyst 32 may also be changed easily by replacing the piston 30*b*. This allows a given catalyst 32 to be replaced with a more active or less active catalyst (depending on the particular application). It should be understood that hollow pistons 30*a* may also be used in this embodiment and replaced in this and other embodiments.

Figure 9A:
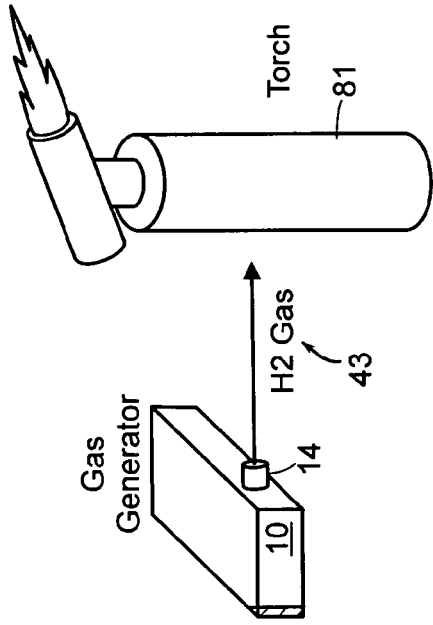
FIGS. 9A and 9B are diagrams of example other applications in which a gas generator according to the principles of the present invention may be employed.
Figure 9B:
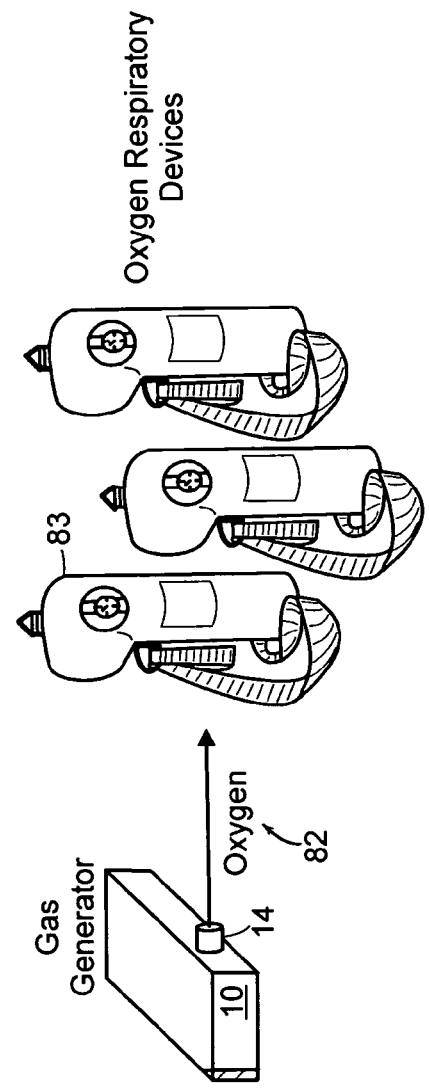

FIGS. 9A and 9B illustrate examples of applications for which a gas generator according to the principles of the present invention may be employed other than for fuel cell applications.

In FIG. 9A, the gas generator 10 generates hydrogen gas 43 and provides the gas via its gas output port(s) 14 to a jeweler's torch 81 or other combustion device. It should be understood that the gas generator 10 may produce other gases through decomposition of chemical supplies in the presence of catalysts (not described herein but known in the art) for combustion by the torch 81 or other combustion devices.

In FIG. 9B, the gas generator 10 generates oxygen gas 82 and provides the gas via its gas output port(s) 14 to an oxygen respiratory device 83. The gas generator 10 may also be used with other respiratory devices, such as a diver's tank, in which case a single or multiple gas generators 10 may be used to provide a combination of nitrogen and oxygen to the tank for use by divers in underwater dives.

The gas generators of FIGS. 9A and 9B are located external from the gas consuming devices 81 and 83, respectively, for illustration purposes only. It should be understood that in practice, the gas consuming devices 81, 83 may provide compartments into which the gas generator(s) 10 are inserted. The gas consuming devices 81 may include generic or custom latching mechanisms (not shown) that hold the gas generator(s) in place.

While this invention has been particularly shown and described with references to preferred embodiments thereof, it will be understood by those skilled in the art that various changes in form and details may be made therein without departing from the scope of the invention encompassed by the appended claims.

For example, it is well known that aqueous NaBH$_4$ solutions have a tendency to slowly self-decompose and form hydrogen gas as per Equation 1, even in the absence of any catalyst. A possible solution for long-term storage is to pack NaBH$_4$ powder while dry and separate it from the water and/or NaOH, then mix the two ingredients when the need to generate hydrogen gas arises. These two components may be packaged in a breakable glass or membrane-separated design such that when the glass or membrane is broken within the catalytic reactor before use, the NaBH$_4$ chemical supply 42 and water can mix.

As an additional safety or control feature for the embodiments of gas generators described herein, an electrical potential can be applied between the catalyst 32 and the chemical solution 42 to control gas evolution enabled by the catalyst 32.

The disclosed gas generator embodiments allow for inclusion of additional features that may enhance the storage, handling, and treatment of the product gases. Examples other than those already described include a heating element, where the increased temperature accelerates production of gas, or a piezoelectric device, which generates gas from a particular solution or mixture through vibration.

To make the gas generators described herein user-friendly and self-identifying, the gas outlet(s) 14 may have a standard or custom shape for interfacing with various devices on a standard or application-by-application basis. For example, the gas outlets may be shaped in the form of an 'O' or 'H' to indicate that oxygen or hydrogen gas, respectively, is generated by the gas generator 10. Such designs can be useful for preventing user error where multiple gas generators are being used in a given application.

What is claimed is:

1. A self-regulating gas generator, comprising:
   a chemical supply chamber containing a chemical supply;
   at least one element structurally impermeable to passage of the chemical supply that interacts with the chemical supply;
   a catalyst coupled to the at least one element causing the chemical supply to decompose in its presence into products, including a generated gas, in the chemical supply chamber;
   a gas storage chamber that allows the generated gas to be stored until use;

a gas permeable structure through which the generated gas passes on a path from the chemical supply chamber to the gas storage chamber; and a feedback system utilizing force generated in part as a function of relative pressures in the chambers to position the catalyst in the chemical supply to self-regulate rate of generation of the generated gas.

2. The gas generator of claim 1 wherein the at least one element translates relative to the chemical supply chamber.

3. The gas generator of claim 1 wherein the at least one element rotates relative to the chemical supply chamber.

4. The gas generator of claim 1 wherein the at least one element remains in a fixed position relative a body that includes the chemical supply chamber.

5. The gas generator of claim 1 wherein motion of the at least one element alters the amount of catalyst exposed to the chemical supply.

6. The gas generator of claim 1 wherein the at least one element is a ceramic or is made of thermally-conductive material.

7. The gas generator of claim 1 wherein the at least one element is a piston.

8. The gas generator of claim 1 wherein the at least one element is hollow.

9. The gas generator of claim 1 wherein the at least one element includes multiple channels therein adapted to allow the generated gas to flow therethrough.

10. The gas generator of claim 1 wherein the at least one element is solid.

11. The gas generator of claim 1 wherein:
the at least one element is a solid piston that moves relative to the chemical supply chamber to a position that creates an equilibrium of forces acting upon the solid piston; and
at least a portion of the chemical supply chamber is bounded by the gas permeable structure.

12. The gas generator of claim 1 wherein:
the at least one element is a solid piston that moves relative to the chemical supply chamber to a position that creates an equilibrium of forces acting upon the solid piston, the forces including force due to a spring operatively coupled to the solid piston; and
at least a portion of the chemical supply chamber is bounded by the gas permeable structure.

13. The gas generator of claim 1 further including an adjustable spring operatively coupled to the at least one element allowing the relationship between pressure in the gas storage chamber and the position of the at least one element to be adjusted.

14. The gas generator of claim 1 wherein the at least one element is coated with a gas-permeable catalyst layer and the gas permeable structure.

15. The gas generator of claim 1 wherein the at least one element is coated with the gas permeable structure.

16. The gas generator of claim 1 wherein the at least one element is covered with the gas permeable structure.

17. The gas generator of claim 1 wherein the at least one element is integrated with the gas permeable structure.

18. The gas generator of claim 1 wherein the at least one element includes a non-catalytic portion.

19. The gas generator of claim 18 wherein the at least one element is a piston and the non-catalytic portion is at an end of the piston.

20. The gas generator of claim 18 wherein the at least one element is adapted to position the non-catalytic portion with respect to the chemical supply to discontinue decomposition of the chemical supply.

21. The gas generator of claim 1 wherein the gas permeable structure separates generated gas from the chemical supply.

22. The gas generator of claim 21 wherein the gas permeable structure includes metal.

23. The gas generator of claim 21 wherein the gas permeable structure includes palladium (Pd).

24. The gas generator of claim 21 wherein the gas permeable structure includes palladium alloy.

25. The gas generator of claim 21 wherein the gas permeable structure includes a polymer.

26. The gas generator of claim 21 wherein the gas permeable structure includes ceramic.

27. The gas generator of claim 1 wherein the catalyst includes at least one of the following catalysts: a metal, metal boride, or polymer.

28. The gas generator of claim 1 wherein the catalyst is attached to the gas permeable structure.

29. The gas generator of claim 1 wherein the catalyst is coated upon the gas permeable structure.

30. The gas generator of claim 1 wherein the catalyst is attached to or coated on a non-permeable portion of said at least one element.

31. The gas generator of claim 1 further including at least one pressure relief valve reducing pressure of the gas storage chamber or chemical supply chamber if pressure in the respective chamber exceeds a predetermined threshold.

32. The gas generator of claim 1 wherein the feedback system utilizes a force generated by a pressure differential between the gas storage chamber and the chemical supply chamber.

33. The gas generator of claim 1 further including a reference pressure chamber, and wherein the feedback system utilizes a force generated by a pressure differential between the gas storage chamber and the reference pressure chamber.

34. The gas generator of claim 1 further including a reference pressure chamber, and wherein the feedback system utilizes a force generated by a pressure differential between the chemical supply chamber and the reference pressure chamber.

35. The gas generator of claim 1 further including a spring coupled to the at least one element, wherein the feedback system utilizes a differential between a pressure, in at least one of the chambers acting upon the at least one element and a force of the spring acting upon the at least one element.

36. The gas generator of claim 1 wherein the chemical supply includes $NaBH_4$ stored as a dry powder that is caused to mix with a predetermined liquid (i) by breaking a membrane containing the dry $NaBH_4$ powder, (ii) by shaking or squeezing the gas generator, or (iii) by puncturing the membrane.

37. The gas generator of claim 1 wherein the generated gas is hydrogen gas.

38. The gas generator of claim 1 wherein the generated gas is oxygen.

39. The gas generator of claim 1 adapted for use with a fuel cell.

40. The gas generator of claim 1 adapted for use with a gas combustion device.

41. The gas generator of claim 1 adapted for use with a respiratory device.

42. A method of generating gas, comprising:
decomposing a chemical supply into products, including a generated gas, in a chemical supply chamber in the presence of a catalyst coupled to at least one element structurally impermeable to passage of the chemical supply;

allowing the generated gas substantially free of the chemical supply to pass from the chemical supply chamber to a gas storage chamber via a gas permeable structure for storage until use;

storing at least a portion of the generated gas in the gas storage chamber until use; and utilizing force generated in part as a function of relative pressures in the chambers to position the catalyst in the chemical supply to self-regulate rate of generation of the generated gas.

43. The method of claim 42 wherein utilizing a force includes translating the catalyst relative to the chemical supply.

44. The method of claim 42 wherein utilizing a force includes rotating the catalyst relative to the chemical supply.

45. The method of claim 42 wherein utilizing a force includes moving the chemical supply relative to the catalyst.

46. The method of claim 42 wherein utilizing the force includes altering the amount of catalyst exposed to the chemical supply.

47. The method of claim 42 wherein the catalyst is coupled to a ceramic or is made of thermally-conductive material.

48. The method of claim 42 wherein the at least one element is at least one hollow element and wherein allowing the generated gas to pass from the chemical supply chamber to a gas storage chamber via a gas permeable structure includes allowing the generated gas to pass through a channel in the at least one hollow element.

49. The method of claim 42 wherein allowing the generated gas to pass via a gas permeable structure includes allowing the generated gas to flow through the chemical supply and through the gas permeable structure positioned apart from the catalyst.

50. The method of claim 42 wherein:
utilizing a force includes moving the catalyst relative to the chemical supply to a position that creates an equilibrium of forces acting upon the at least one element to which the catalyst is coupled; and
allowing the generated gas to pass from the chemical supply chamber to the gas storage chamber via the gas permeable structure includes flowing the generated gas to a boundary of the chemical supply.

51. The method of claim 42 wherein:
utilizing a force includes moving the catalyst relative to the chemical supply to a position that creates an equilibrium of forces acting upon the at least one element to which the catalyst is coupled, the forces including force due to a spring operatively coupled to the at least one element; and
allowing the generated gas to pass from the chemical supply chamber to the gas storage chamber via the gas permeable structure includes flowing the generated gas to a boundary of the chemical supply.

52. The method of claim 42 wherein utilizing a force to position the catalyst includes enabling adjustment of the relationship between pressure in the gas storage chamber and the position of the catalyst.

53. The method of claim 42 wherein the catalyst is coated on the gas permeable structure.

54. The method of claim 42 wherein decomposing the chemical supply includes discontinuing decomposing the chemical supply if the generated gas is not in use.

55. The method of claim 42 further including separating hydrogen gas from the chemical supply.

56. The method of claim 42 wherein the gas permeable structure includes palladium or a polymer structure.

57. The method of claim 42 wherein the catalyst includes at least one of the following catalysts: metal, metal boride or polymer.

58. The method of claim 42 wherein the catalyst is attached or coated upon the gas permeable structure.

59. The method of claim 42 further including reducing pressure of the gas storage chamber or chemical supply chamber if pressure in the respective chamber exceeds a predetermined threshold.

60. The method of claim 42 wherein utilizing a force includes positioning the catalyst in the chemical supply as a function of a pressure differential between the gas storage chamber and the chemical supply chamber.

61. The method of claim 42 further including a reference pressure chamber and wherein utilizing a force includes positioning the catalyst in the chemical supply as a function of a pressure differential between the gas storage chamber and the reference pressure chamber.

62. The method of claim 42 further including a reference pressure chamber and wherein utilizing a force includes positioning the catalyst in the chemical supply as a function of a pressure differential between the chemical supply chamber and the reference pressure chamber.

63. The method of claim 42 further including applying a non-pressure force to the at least one element to which the catalyst is coupled and wherein utilizing a force includes positioning the at least one element with the catalyst as a function of a differential between a pressure in at least one of the chambers acting upon the element and the non-pressure force acting upon the element.

64. The method of claim 42 wherein the chemical supply is stored as a dry powder and further including mixing the chemical supply with a predetermined liquid prior to decomposing the chemical supply into products.

65. The method of claim 42 wherein the generated gas is hydrogen gas.

66. The method of claim 42 wherein the generated gas is oxygen.

67. The method of claim 42 used with a fuel cell.

68. The method of claim 42 used with a gas combustion device.

69. The method of claim 42 used with a respiratory device.

70. An apparatus for generating a gas comprising:
means for decomposing a chemical supply into products, including a generated gas, in a chemical supply chamber in the presence of a catalyst;
means for passing the generated gas substantially free of the chemical supply from the chemical supply chamber to a gas storage chamber via a gas permeable structure for storage until use; and
means for utilizing force generated in part by pressure in at least one of the chambers to position the catalyst in the chemical supply to regulate rate of generation of the generated gas.

71. The apparatus of claim 70 wherein the means for decomposing the chemical supply into products includes means for discontinuing the decomposing of the chemical supply into products.

72. The gas generator of claim 1 further including at least one wipe adapted to dislodge the products from the at least one element.

73. The gas generator of claim 1 wherein the element is configured to dislodge the chemical supply or products from the catalyst or configured to have the chemical supply or products dislodged from the catalyst.

74. The gas generator of claim 73 further including a wipe in operable arrangement with the catalyst to dislodge the products from the catalyst.

75. The gas generator of claim 1 further including a capacity indicator activating if the gas storage chamber reaches a predetermined gas pressure.

76. The gas generator of claim 1 further including a capacity indicator indicating gas pressure.

77. The gas generator of claim 1 further including a capacity indicator indicating a position of the at least one element.

78. The gas generator of claim 1 further including a capacity indicator indicating an amount of unspent chemical supply.

79. The gas generator of claim 1 further including a human-readable capacity indicator.

80. The gas generator of claim 1 further including a filter through which the generated gas passes before output for use by an external device.

81. The gas generator of claim 1 further including a humidifier through which the generated gas passes before output for use by an external device.

82. The gas generator of claim 1 wherein the chemical supply is a liquid.

83. The gas generator of claim 1 wherein the chemical supply is a gas dissolved in a liquid.

84. The gas generator of claim 1 wherein the chemical supply is a solid dissolved in a liquid.

85. The gas generator of claim 1 wherein the chemical supply is a combination of a liquid and a gas dissolved in the liquid.

86. The gas generator of claim 1 wherein the chemical supply comprises any chemical hydride.

87. The gas generator of claim 1 wherein the chemical supply is an aqueous $NaBH_4$ solution.

88. The gas generator of claim 1 wherein the chemical supply comprises an aqueous $NaBH_4$ solution, optionally including a co-solvent or an additive.

89. The gas generator of claim 88 wherein the aqueous $NaBH_4$ solution includes at least one alkali metal salt.

90. A gas generator according to claim 1 wherein the chemical supply is aqueous $NaBH_4$ solution that decomposes in the presence of the catalyst to produce hydrogen gas, wherein the catalyst includes at least one of the following catalysts: Ruthenium, Rhodium, Palladium, Iridium, Platinum, Rhenium, and Nickel.

91. A self-regulating gas generator, comprising:
a chemical supply chamber configured to contain a chemical supply;
a gas storage chamber configured to store a gas until use;
a gas permeable, liquid impermeable structure configured to enable a gas to pass on a path from the chemical supply chamber to the gas storage chamber; and
an element that does not provide a path for the chemical supply to pass from the chemical supply chamber and that is arranged to expose a catalyst to the chemical supply, to decompose the chemical supply in its chamber into products including a gas, as a function of relative pressures in at least one of the chambers to automatically self-regulate rate of generation of the gas.

92. The gas generator of claim 91 wherein motion of the element alters the amount of catalyst exposed to the chemical supply.

93. The gas generator of claim 91 further including an adjustable spring operatively coupled to the element allowing the relationship between pressure in the gas storage chamber and the position of the element to be adjusted.

94. The gas generator of claim 91 wherein the element includes a non-catalytic portion.

95. The gas generator of claim 94 wherein the element is a piston and the non-catalytic portion is at an end of the piston.

96. The gas generator of claim 91 wherein the element is configured to dislodge the chemical supply or products from the catalyst or configured to have the chemical supply or products dislodged from the catalyst.

97. The gas generator of claim 96 further including a wipe in operable arrangement with the catalyst to dislodge the products from the catalyst.

98. The gas generator of claim 91 further including a capacity indicator activating if the gas storage chamber reaches a predetermined gas pressure.

99. The gas generator of claim 91 further including a capacity indicator indicating gas pressure.

100. The gas generator of claim 91 further including a capacity indicator indicating a position of the element.

101. The gas generator of claim 91 further including a capacity indicator indicating an amount of unspent chemical supply.

102. The gas generator of claim 91 further including a human-readable capacity indicator.

103. The gas generator of claim 91 further including at least one pressure relief valve reducing pressure of the gas storage chamber or chemical supply chamber if pressure in the respective chamber exceeds a predetermined threshold.

104. The gas generator of claim 91 further including a filter through which the generated gas passes before output for use by an external device.

105. The gas generator of claim 91 further including a humidifier through which the generated gas passes before output for use by an external device.

106. The gas generator of claim 91 further including a reference pressure chamber, and wherein the element is also arranged to expose the catalyst to the chemical supply as a function of a force generated by a pressure differential between the gas storage chamber and the reference pressure chamber.

107. The gas generator of claim 91 further including a reference pressure chamber, and wherein the element is also arranged to expose the catalyst to the chemical supply as a function of a force generated by a pressure differential between the chemical supply chamber and the reference pressure chamber.

108. The gas generator of claim 91 further including a spring coupled to the element, wherein the element is also arranged to expose the catalyst to the chemical supply as a function of a differential between a pressure, in at least one of the chambers acting upon the element, and a force of the spring acting upon the element.

109. The gas generator of claim 91 wherein the chemical supply is a liquid.

110. The gas generator of claim 91 wherein the chemical supply is a gas dissolved in a liquid.

111. The gas generator of claim 91 wherein the chemical supply is a solid dissolved in a liquid.

112. The gas generator of claim 91 wherein the chemical supply comprises any chemical hydride.

113. The gas generator of claim 91 wherein the chemical supply is an aqueous $NaBH_4$ solution.

114. The gas generator of claim 91 wherein the chemical supply comprises an aqueous $NaBH_4$ solution, optionally including a co-solvent or an additive.

115. The gas generator of claim 114 wherein the aqueous $NaBH_4$ solution includes at least one alkali metal salt.

116. A gas generator according to claim 91 wherein the chemical supply is aqueous $NaBH_4$ solution that decomposes in the presence of the catalyst to produce hydrogen gas, wherein the catalyst includes at least one of the following catalysts: Ruthenium, Rhodium, Palladium, Iridium, Platinum, Rhenium, and Nickel.

117. The gas generator of claim 91 wherein the chemical supply includes $NaBH_4$ stored as a dry powder that is caused to mix with a predetermined liquid (i) by breaking a membrane containing the dry $NaBH_4$ powder, (ii) by shaking or squeezing the gas generator, or (iii) by puncturing the membrane.

118. The gas generator of claim 91 wherein the generated gas is hydrogen gas.

119. The gas generator of claim 91 wherein the generated gas is oxygen.

120. The gas generator of claim 91 adapted for use with a fuel cell.

121. The gas generator of claim 91 adapted for use with a gas combustion device.

122. The gas generator of claim 91 adapted for use with a respiratory device.

123. The method of claim 42 further including dislodging products from the catalyst.

124. The method of claim 42 further comprising dislodging the chemical supply or products from the catalyst or having the chemical supply or products dislodged from the catalyst.

125. The method of claim 124 further including arranging a wipe to be in operable arrangement with the catalyst to dislodge the products from the catalyst.

126. The method of claim 42 further including activating a capacity indicator if the gas storage chamber reaches a predetermined gas pressure.

127. The method of claim 42 further including indicating gas pressure.

128. The method of claim 42 further including indicating a position of the catalyst in the chemical supply chamber.

129. The method of claim 42 further including indicating an amount of unspent chemical supply.

130. The method of claim 42 further including displaying a metric associated with the rate of generation of the generated gas.

131. The method of claim 42 further including filtering the generated gas before output for use by an external device.

132. The method of claim 42 further including humidifying the generated gas before output for use by an external device.

133. The method of claim 42 wherein decomposing the chemical supply includes decomposing a liquid into products.

134. The method of claim 42 wherein decomposing the chemical supply includes decomposing a gas dissolved in a liquid into products.

135. The method of claim 42 wherein decomposing the chemical supply includes decomposing a solid dissolved in a liquid into products.

136. The method of claim 42 wherein decomposing the chemical supply includes decomposing a combination of a liquid and a gas dissolved in a liquid into products.

137. The method of claim 42 wherein decomposing the chemical supply includes decomposing any chemical hydride.

138. The method of claim 42 wherein decomposing the chemical supply includes decomposing an aqueous $NaBH_4$ solution.

139. The method of claim 42 wherein decomposing the chemical supply includes decomposing a solution of $NaBH_4$ and at least one alkali metal salt.

140. The method of claim 139 wherein the aqueous $NaBH_4$ solution includes an effective amount of a co-solvent or other additive.

141. The method of claim 42 wherein decomposing the chemical supply includes decomposing an aqueous $NaBH_4$ solution to produce hydrogen gas using at least one of the following catalysts: Ruthenium, Rhodium, Palladium, Iridium, Platinum, Rhenium, and Nickel.

* * * * *